(12) United States Patent
Horiba et al.

(10) Patent No.: US 11,358,595 B2
(45) Date of Patent: Jun. 14, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Ayumu Horiba, Wako (JP); Tadahiko Kanoh, Wako (JP); Katsuya Yashiro, Wako (JP); Chihiro Oguro, Wako (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 16/923,176

(22) Filed: Jul. 8, 2020

(65) Prior Publication Data
US 2021/0009127 A1    Jan. 14, 2021

(30) Foreign Application Priority Data

Jul. 11, 2019 (JP) .............................. JP2019-129357

(51) Int. Cl.
*B60W 30/16* (2020.01)
*B60W 30/18* (2012.01)

(52) U.S. Cl.
CPC .... *B60W 30/162* (2013.01); *B60W 30/18163* (2013.01); *B60W 2420/42* (2013.01)

(58) Field of Classification Search
CPC .... B60W 30/12; B60W 30/14; B60W 30/143; B60W 30/146; B60W 30/16;
(Continued)

(56) References Cited

U.S. PATENT DOCUMENTS 5,781,119 A * 7/1998 Yamashita ............. G05D 1/024
                                                                  180/168
8,903,588 B2 * 12/2014 Schmudderich ....... G06V 20/58
                                                                   701/96

(Continued)

FOREIGN PATENT DOCUMENTS

| JP | 2010-158924 | 7/2010 |
| JP | 2015-182525 | 10/2015 |
| JP | 2017-030435 | 2/2017 |

OTHER PUBLICATIONS

Japanese Office Action for Japanese Patent Application No. 2019-129357 dated Mar. 8, 2022.

*Primary Examiner* — Angelina Shudy
(74) *Attorney, Agent, or Firm* — Amin, Turocy & Watson, LLP

(57) ABSTRACT

A vehicle control system includes a recognition unit recognizing a surrounding environment of an own vehicle, and a driving control unit controlling a speed or steering of the own vehicle on the basis of a recognition result from the recognition unit, in which the driving control unit causes the own vehicle to perform a first operation in which an inter-vehicle distance between a preceding vehicle and the own vehicle is reduced, and a second operation in which an inter-vehicle distance between the preceding vehicle and the own vehicle is increased after the first operation in a case where a change amount of another vehicle satisfies a predetermined condition or another vehicle is identified as a cutting-in vehicle, on the basis of one of a behavior or a position of another vehicle when another vehicle traveling in an adjacent lane that is adjacent to a traveling lane of the own vehicle changes lane to the traveling lane.

7 Claims, 16 Drawing Sheets

(58) Field of Classification Search
CPC ............ B60W 30/162; B60W 30/165; B60W 30/18163; B60W 2420/42; B60W 2540/229; B60W 2554/4045; B60W 50/0097; B60W 2754/30; G08G 1/22; G05D 1/0287–0297

See application file for complete search history.

(56) References Cited

U.S. PATENT DOCUMENTS

| | | | | |
|---|---|---|---|---|
| 9,002,614 | B2* | 4/2015 | Tominaga | B60K 31/0008 |
| | | | | 701/96 |
| 9,669,872 | B2* | 6/2017 | Rebhan | B60W 30/16 |
| 10,384,681 | B2* | 8/2019 | Masui | B60W 40/04 |
| 10,559,205 | B2* | 2/2020 | Minemura | B60T 7/22 |
| 10,647,316 | B2* | 5/2020 | Lee | G06N 20/10 |
| 10,654,481 | B2* | 5/2020 | Ide | B60W 10/20 |
| 10,703,262 | B1* | 7/2020 | Hong | H04W 4/40 |
| 2007/0027597 | A1* | 2/2007 | Breuel | B60W 30/16 |
| | | | | 701/41 |
| 2009/0088925 | A1* | 4/2009 | Sugawara | B60W 30/12 |
| | | | | 340/436 |
| 2011/0054793 | A1* | 3/2011 | Harada | G08G 1/096725 |
| | | | | 701/301 |
| 2013/0054106 | A1* | 2/2013 | Schmudderich | G06V 20/58 |
| | | | | 701/1 |
| 2013/0226433 | A1* | 8/2013 | Tominaga | B60W 50/0097 |
| | | | | 701/96 |
| 2015/0246677 | A1* | 9/2015 | Eken | B60W 30/16 |
| | | | | 701/96 |
| 2015/0321699 | A1* | 11/2015 | Rebhan | B60W 30/14 |
| | | | | 701/23 |
| 2016/0280266 | A1* | 9/2016 | Kawamata | B62D 15/0265 |
| 2016/0297447 | A1* | 10/2016 | Suzuki | B60W 30/16 |
| 2016/0304092 | A1* | 10/2016 | Rebhan | B60W 30/16 |
| 2016/0304097 | A1* | 10/2016 | Taira | G06K 9/00791 |
| 2016/0347175 | A1* | 12/2016 | Yamashita | B60K 31/0008 |
| 2017/0057504 | A1* | 3/2017 | Lee | B60W 40/08 |
| 2017/0066443 | A1* | 3/2017 | Kobayashi | B60W 30/16 |
| 2017/0225682 | A1* | 8/2017 | Schunk | B60L 9/00 |
| 2017/0240176 | A1* | 8/2017 | Aoki | B60W 40/04 |
| 2017/0305422 | A1* | 10/2017 | Ito | B60W 50/14 |
| 2017/0349173 | A1* | 12/2017 | Nishiguchi | B60W 60/00 |
| 2017/0369067 | A1* | 12/2017 | Saigusa | B60W 30/18163 |
| 2018/0111617 | A1* | 4/2018 | Stahl | B60W 40/04 |
| 2018/0240345 | A1* | 8/2018 | So | B60W 30/08 |
| 2018/0251129 | A1* | 9/2018 | Ji | B60W 30/18163 |
| 2018/0366001 | A1* | 12/2018 | Matsunaga | G08G 1/166 |
| 2019/0061758 | A1* | 2/2019 | Ide | B60K 31/0008 |
| 2019/0086511 | A1* | 3/2019 | Takeuchi | G01S 13/87 |
| 2019/0315355 | A1* | 10/2019 | Tokimasa | B60W 30/14 |
| 2020/0057453 | A1* | 2/2020 | Laws | B60W 10/20 |
| 2020/0110416 | A1* | 4/2020 | Hong | G06V 20/584 |
| 2020/0125086 | A1* | 4/2020 | Switkes | G05D 1/0027 |
| 2021/0269065 | A1* | 9/2021 | Haggblade | G08G 1/0133 |

\* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2019-129357, filed Jul. 11, 2019, the content of which is incorporated herein by reference.

BACKGROUND OF THE INVENTION

Field of the Invention

The present invention relates to a vehicle control system, a vehicle control method, and a storage medium.

Description of Related Art

In the related art, there is a technique of causing an own vehicle to follow a preceding vehicle (for example, refer to Japanese Unexamined Patent Application, First Publication No. 2015-182525).

SUMMARY OF THE INVENTION

In the related art, in a case where there is an adjacent lane such as a merging lane that merges with an own lane in an advancing direction of an own vehicle, it is necessary to unconditionally give priority to another vehicle to enter the own lane, or to stop control of following a preceding vehicle in order to cope with another vehicle.

Aspects related to the present invention have been made in consideration of these circumstances, and one of objects thereof is to provide a vehicle control system, a vehicle control method, and a storage medium capable of causing an own vehicle to perform an appropriate behavior according to a behavior of another vehicle entering an own lane.

In order to solve the problem and to achieve the object, the present invention employs the following aspects.

(1): According to an aspect of the present invention, there is provided a vehicle control system including a recognition unit configured to recognize a surrounding environment of an own vehicle; and a driving control unit configured to control a speed or steering of the own vehicle on the basis of a recognition result from the recognition unit, in which the driving control unit causes the own vehicle to perform a first operation in which an inter-vehicle distance between a preceding vehicle and the own vehicle is reduced, and a second operation in which an inter-vehicle distance between the preceding vehicle and the own vehicle is increased after the first operation in a case where a change amount of another vehicle satisfies a predetermined condition or another vehicle is identified as a cutting-in vehicle, on the basis of one of a behavior or a position of another vehicle when another vehicle traveling in an adjacent lane that is adjacent to a traveling lane of the own vehicle changes lane to the traveling lane.

(2): In the aspect of the above (1), the driving control unit may cause the own vehicle to perform the second operation in a case where a behavior of another vehicle and a position of another vehicle recognized by the recognition unit indicate that another vehicle will cut in front of the own vehicle.

(3): In the aspect of the above (1) or (2), the driving control unit may include a following traveling control unit causing the own vehicle to travel by following a preceding vehicle traveling in front of the own vehicle, and cause the own vehicle to follow another vehicle in a case where another vehicle has completed lane change to an own lane in front of the own vehicle.

(4): In the aspect of any one of the above (1) to (3), the adjacent lane may be a merging lane in which a vehicle that is to move to the own lane is traveling.

(5): In the aspect of any one of the above (1) to (4), the driving control unit may cause the own vehicle to perform the first operation and the second operation after the first operation in a case where it is recognized by the recognition unit that a line of vehicles traveling in the adjacent lane is static.

(6): In the aspect of any one of the above (1) to (5), the vehicle control system may further include an imaging unit configured to image a vehicle cabin, and, in a case where it is detected by the imaging unit that an occupant of the own vehicle is monitoring a periphery outside the own vehicle, the driving control unit may cause the own vehicle to perform the second operation even when a behavior of another vehicle recognized by the recognition unit indicates that another vehicle cuts in front of the own vehicle.

(7): According to another aspect of the present invention, there is provided a vehicle control method of causing a computer to recognize a surrounding environment of an own vehicle; control a speed or steering of the own vehicle on the basis of a recognition result; and cause the own vehicle to perform a first operation in which an inter-vehicle distance between a preceding vehicle and the own vehicle is reduced, and a second operation in which an inter-vehicle distance between the preceding vehicle and the own vehicle is increased after the first operation in a case where a change amount of another vehicle satisfies a predetermined condition or another vehicle is identified as a cutting-in vehicle, on the basis of one of a behavior or a position of another vehicle when another vehicle traveling in an adjacent lane that is adjacent to a traveling lane of the own vehicle changes lane to the traveling lane.

(8): According to still another aspect of the present invention, there is provided a non-transitory computer readable storage medium storing a program causing a computer to recognize a surrounding environment of an own vehicle; control a speed or steering of the own vehicle on the basis of a recognition result; and cause the own vehicle to perform a first operation in which an inter-vehicle distance between a preceding vehicle and the own vehicle is reduced, and a second operation in which an inter-vehicle distance between the preceding vehicle and the own vehicle is increased after the first operation in a case where a change amount of another vehicle satisfies a predetermined condition or another vehicle is identified as a cutting-in vehicle, on the basis of one of a behavior or a position of another vehicle when another vehicle traveling in an adjacent lane that is adjacent to a traveling lane of the own vehicle changes lane to the traveling lane.

According to the aspects of the above (1) to (8), it is possible to cause an own vehicle to perform an appropriate behavior according to a behavior of another vehicle entering an own lane. As a result, it is possible to suppress cutting-in of other vehicles while giving priority to another vehicle attempting to enter an own lane forcibly, and thus an occupant's convenience is improved.

DETAILED DESCRIPTION OF THE INVENTION

Hereinafter, with reference to the drawings, a vehicle control system, a vehicle control method, and a storage medium according to an embodiment of the present invention will be described. Hereinafter, description will be made on the premise of a country or a region to which the left-hand traffic regulations are applied, but, in a case where the right-hand traffic regulations are applied, the terms left and right may be reversed.

Embodiment

Overall Configuration

Figure 1:
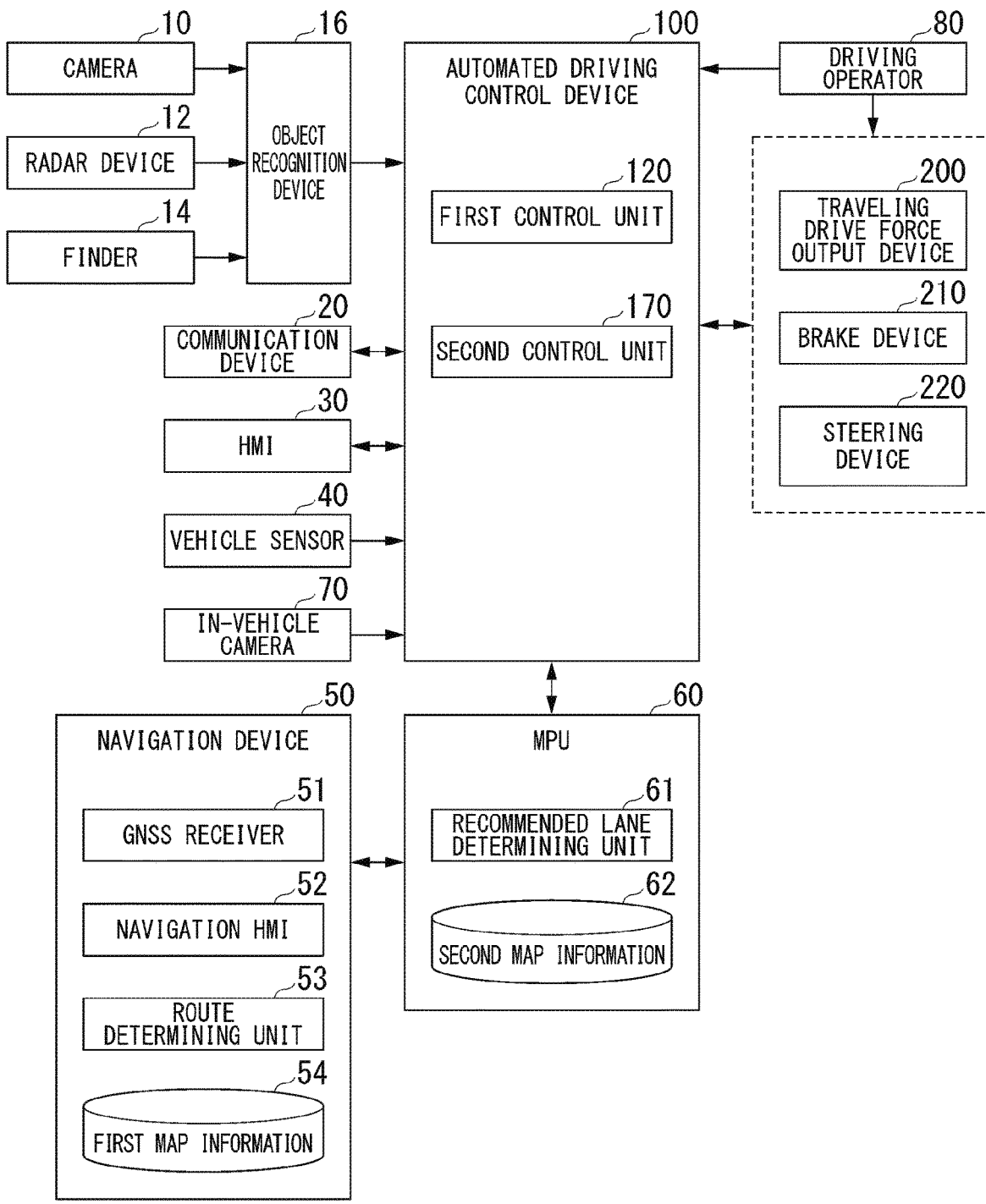
FIG. 1 is a diagram illustrating a configuration of a vehicle control system related to an embodiment.

FIG. 1 is a diagram illustrating a configuration of a vehicle control system 1 related to an embodiment. A vehicle having the vehicle control system 1 mounted thereon is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle control system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, an in-vehicle camera 70, a driving operator 80, an automated driving control device 100, a traveling drive force output device 200, a brake device 210, and a steering device 220. The devices and the apparatuses are connected to each other via a multiplex communication line such as a controller area network (CAN) communication line, a serial communication line, or a wireless communication network. The configuration illustrated in FIG. 1 is only an example, and some of the constituents may be omitted, and other constituents may be added.

The camera 10 is a digital camera using a solid-state imaging element such as a charge coupled device (CCD) or a complementary metal oxide semiconductor (CMOS). The camera 10 is attached at any location in a vehicle (hereinafter, an own vehicle M) on which the vehicle control system 1 is mounted. In a case where the front side is imaged, the camera 10 is attached to the upper part of a front windshield, the back surface of an interior mirror, or the like. For example, the camera 10 periodically and repeatedly images the periphery of the own vehicle M. The camera 10 may be a stereo camera. The camera 10 is an example of an "imaging unit".

The radar device 12 radiates electric waves such as millimeter waves in the periphery of the own vehicle M, detects electric waves (reflected waves) reflected by an object, and thus detects at least a position (a distance and an azimuth) of the object. The radar device 12 is attached at any location in the own vehicle M. The radar device 12 may detect a position and a speed of an object according to a frequency modulated continuous wave (FM-CW) method.

The finder 14 is light detection and ranging (LIDAR). The finder 14 applies light in the periphery of the own vehicle M, and measures scattered light. The finder 14 detects a distance to a target on the basis of a time from light emission to light reception. The applied light is, for example, pulsed laser light. The finder 14 is attached at any location in the own vehicle M.

The object recognition device 16 performs a sensor fusion process on detection results from some or all of the camera 10, the radar device 12, and the finder 14, and thus recognizes a position, the type, a speed, and the like of an object. The object recognition device 16 outputs a recognition result to the automated driving control device 100. The object recognition device 16 may output detection results from the camera 10, the radar device 12, and the finder 14 to the automated driving control device 100 without change. The object recognition device 16 may be omitted from the vehicle control system 1.

The communication device 20 performs communication with another vehicle present in the periphery of the own vehicle M, or performs communication with various server apparatus via a wireless base station by using, for example, a cellular network, a Wi-Fi network, Bluetooth (registered trademark), or Dedicated Short Range Communication (DSRC).

The HMI 30 presents various pieces of information to an occupant of the own vehicle M, and also receives an input operation from the occupant. The HMI 30 includes various display devices, a speaker, a buzzer, a touch panel, switches, keys, and the like.

The vehicle sensor 40 includes, for example, a vehicle speed sensor detecting a speed of the own vehicle M, an acceleration sensor detecting an acceleration, a yaw rate sensor detecting an angular speed about a vertical axis, and an azimuth sensor detecting an orientation of the own vehicle M.

The navigation device 50 includes, for example, a global navigation satellite system (GNSS) receiver 51, a navigation HMI 52, and a route determining unit 53. The navigation device 50 stores first map information 54 in a storage device such as a hard disk drive (HDD) or a flash memory. The GNSS receiver 51 identifies a position of the own vehicle M on the basis of a signal received from a GNSS satellite. A position of the own vehicle M may be identified or complemented by an inertial navigation system (INS) using an output from the vehicle sensor 40. The navigation HMI 52 includes a display device, a speaker, a touch panel, keys, and the like. The navigation HMI 52 may be partially or entirely integrated into the HMI 30 described above. The route determining unit 53 determines, for example, a route (hereinafter, a route on a map) from a position of the own vehicle M identified by the GNSS receiver 51 (or any entered position) to a destination that is entered by an occupant by using the navigation HMI 52 on the basis of the first map information 54. The first map information 54 is, for example, information in which a road shape is expressed by a link indicating a road and nodes connected to each other via the link. The route on the map is output the MPU 60. The navigation apparatus 50 may perform route guidance using the navigation HMI 52 on the basis of the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20, and may acquire a route equivalent to the route on the map from the navigation server.

The MPU 60 includes, for example, a recommended lane determining unit 61, and stores second map information 62 in a storage device such as an HDD or a flash memory. The recommended lane determining unit 61 divides the route on the map provided from the navigation device 50 into a plurality of blocks (for example, divides the route on the map every 100 m in a vehicle advancing direction), and determines a recommended lane for each block by referring to the second map information 62. The recommended lane determining unit 61 determines in which lane from the left the own vehicle will travel. In a case where there is a branch location on the route on the map, the recommended lane determining unit 61 determines a recommended lane such that the own vehicle M can travel on a reasonable route to advance to a branch destination.

The second map information 62 is map information with higher accuracy than that of the first map information 54. The second map information 62 includes, for example, lane center information or lane boundary information. The second map information 62 may include road information, traffic regulation information, address information (address/postal code), facility information, telephone number information, and the like. The second map information 62 may be updated at any time by the communication device 20 performing communication with other devices.

The in-vehicle camera 70 is a digital camera using a solid-state imaging element such as a CCD or a CMOS. The in-vehicle camera 70 is provided in, for example, a vehicle cabin of the own vehicle M, images the vehicle cabin of the own vehicle M, and generates a captured image. The in-vehicle camera 70 may be a stereo camera.

The driving operator 80 includes, for example, an accelerator pedal, a brake pedal, a shift lever, a steering wheel, an odd-shaped steering wheel, a joystick, and other operators. The driving operator 80 is attached with a sensor detecting an operation amount or whether or not an operation is performed, and a detection result is output to the automated driving control device 100 or some or all of the traveling drive force output device 200, the brake device 210, and the steering device 220.

The automated driving control device 100 includes, for example, a first control unit 120 and a second control unit 170. The first control unit 120 and the second control unit 170 are realized, for example, by a hardware processor such as a central processing unit (CPU) executing a program (software). Some or all of the constituent elements may be realized by hardware (a circuit portion; including a circuitry) such as a large scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) such as an HDD or a flash memory of the automated driving control device 100, and may be stored in an attachable and detachable storage medium (non-transitory storage medium) such as a DVD or a CD-ROM and may be installed in the HDD or the flash memory of the automated driving control device 100 when the storage medium is attached to a drive device.

Figure 2:
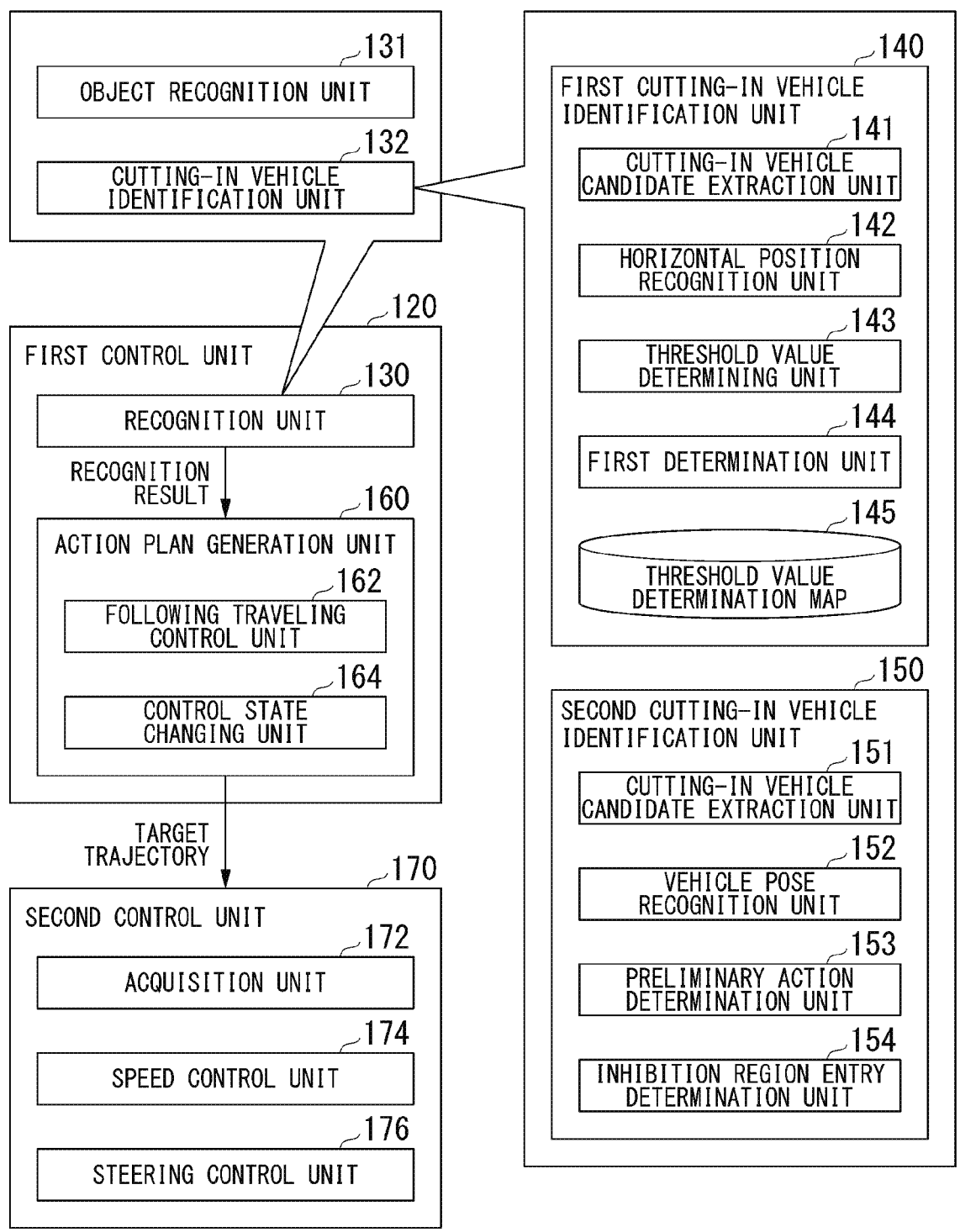
FIG. 2 is a diagram illustrating functional configurations of a first control unit and a second control unit of an automated driving control device related to the embodiment.

FIG. 2 is a diagram illustrating a functional configuration of the first control unit 120 and the second control unit 170 of the automated driving control device 100 related to the embodiment. The first control unit 120 includes, for example, a recognition unit 130 and an action plan generation unit 160. The first control unit 120 is realized by combining, for example, a function of artificial intelligence (AI) with a function of a model provided in advance. For example, a function of "recognizing an intersection" may be realized by executing recognition of the intersection using deep learning and recognition based on conditions (for example, there are a signal that can be matched with a pattern, and a road marking) given in advance in parallel, and scoring and comprehensively evaluating both of recognition results. Consequently, the reliability of automated driving is ensured.

The recognition unit 130 includes, for example, an object recognition unit 131 and a cutting-in vehicle identification unit 132. Details of the object recognition unit 131 and the cutting-in vehicle identification unit 132 will be described later.

The action plan generation unit 160 generates a target trajectory on which the own vehicle M automatedly travels in the future such that the own vehicle can travel in a recommended lane determined by the recommended lane determining unit 61 in principle and can cope with a peripheral situation of the own vehicle M. The target trajectory includes, for example, a speed element. For example, the target trajectory is expressed by sequentially arranging locations (trajectory points) to be reached by the own vehicle M. The trajectory points are locations to be reached by the own vehicle M every predetermined traveling distance (for example, about several [m]) in terms of a distance along a road, and, separately therefrom, a target speed and a target acceleration for each predetermined sampling time (for example, about several tenths of seconds) are generated as parts of the target trajectory.

A trajectory point may be a position to be reached by the own vehicle M at a sampling time point every predetermined sampling time. In this case, information regarding the target speed or the target acceleration may be expressed by an interval between trajectory points. The action plan generation unit 160 may set an automated driving event when generating the target trajectory. The automated driving event includes, for example, a constant speed traveling event, a following traveling event, a lane change event, a branch event, a merging event, and a takeover event.

The action plan generation unit 160 includes, for example, a following traveling control unit 162 and a control state changing unit 164. Details of the following traveling control unit 162 and the control state changing unit 164 will be described later.

The second control unit 170 controls the traveling drive force output device 200, the brake device 210, and the steering device 220 such that the own vehicle M can pass through the target trajectory generated by the action plan generation unit 160 as scheduled.

The second control unit 170 includes, for example, an acquisition unit 172, a speed control unit 174, and a steering control unit 176. The acquisition unit 172 acquires information regarding the target trajectory (trajectory point) generated by the action plan generation unit 160, and stores the information in a memory (not illustrated). The speed control unit 174 controls the traveling drive force output device 200 or the brake device 210 on the basis of the speed element included in the target trajectory stored in the memory. The steering control unit 176 controls the steering device 220 according to a curved state of the target trajectory stored in the memory. Processes in the speed control unit 174 and the steering control unit 176 are realized by, for example, a combination of feedforward control and feedback control. As an example, the steering control unit 176 executes a combination of feedforward control based on a curvature of a road in front of the own vehicle M and feedback control based on deviation from the target trajectory. A combination of the action plan generation unit 160 and the second control unit 170 is an example of a "driving control unit".

The traveling drive force output device 200 outputs traveling drive force (torque) for traveling of the vehicle to drive wheels. The traveling drive force output device 200 includes, for example, a combination of an internal combustion engine, a motor, and a transmission, and an electronic control unit (ECU) controlling the constituents. The ECU controls the constituents according to information input from the second control unit 170 or information input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information input from the second control unit 170 or information input from the driving operator 80, so that brake torque corresponding to a braking operation is output to each vehicle wheel. The brake device 210 may include, as a backup, a mechanism transmitting hydraulic pressure generated by operating the brake pedal included in the driving operator 80 to the cylinder via a master cylinder. The brake device 210 is not limited the above-described configuration, and may be an electronic control type hydraulic brake device that controls an actuator according to information input from the second control unit 170 and thus transmits hydraulic pressure in a master cylinder to the cylinder.

The steering device 220 includes, for example, a steering ECU and an electric motor. The electric motor changes an orientation of a turning wheel by, for example, applying force to a rack-and-pinion mechanism. The steering ECU drives the electric motor on the basis of information input from the second control unit 170 or information input from the driving operator 80, so that an orientation of the turning wheel is changed.

Object Recognition Unit

Hereinafter, details of the constituents of the recognition unit 130 will be described. The object recognition unit 131 recognizes states such as a position, a speed, and an acceleration of an object present in the periphery of the own vehicle M on the basis of information input from the camera 10, the radar device 12, and the finder 14 via the object recognition device 16. In a case where there are a plurality of vehicles in front of the own vehicle M, the recognition unit 130 recognizes an inter-vehicle distance or the like for each vehicle. A position of an object is recognized as, for example, a position in an absolute coordinate system (hereinafter, a vehicle coordinate system) having a representative point (for example, the centroid or the drive axis center) of the own vehicle M as an origin, and is used for control. A position of an object may be represented by a representative point such as the centroid of the object, the center of a front end part in a vehicle width direction, the center of a rear end part in the vehicle width direction, a corner, or a side end part, and may be represented by a region. Positions of a plurality of locations may be recognized as necessary. The object recognition unit 131 may output the reliability regarding recognition of an object in correlation with each recognized object. The reliability recognition of an object is calculated by the object recognition unit 131 on the basis of, for example, a variance of distributions of edges obtained from an image generated by the camera 10, an intensity of a reflected wave detected by the radar device 12, a variance of distributions of intensities of light detected by the finder 14, or the continuity of recognition of the object. In the following description, the reliability correlated with an object will be referred to as an object reliability in some cases. The object reliability is output as quantized information (rank information) such as high, intermediate, and low.

Cutting-in Vehicle Identification Unit

The cutting-in vehicle identification unit 132 identifies, as a cutting-in vehicle, another vehicle that is trying to cut in to a traveling lane from a side (in the road width direction) of the traveling lane of the own vehicle M and may become a target vehicle in the future in a scene in which the own vehicle M is traveling according to the following traveling control unit 162 which will be described later following a vehicle (hereinafter, a preceding vehicle mA) that is traveling in the same direction as that of the own vehicle M in front of the own vehicle M. The cutting-in vehicle identification unit 132 includes a first cutting-in vehicle identification unit 140 and a second cutting-in vehicle identification unit 150. For example, the first cutting-in vehicle identification unit 140 operates regardless of a speed of the own vehicle M, and the second cutting-in vehicle identification unit 150 operates in a case where a speed of the own vehicle M is lower than a predetermined speed Vth (for example, about 20 km/h), that is, during traveling at a low speed, such as in traffic congestion. Therefore, in a case where a speed of the own vehicle M is lower than the predetermined speed Vth, both of the first cutting-in vehicle identification unit 140 and the second cutting-in vehicle identification unit 150 operate, and, in a case where a speed of the own vehicle M is equal to or higher than the predetermined speed Vth, the first cutting-in vehicle identification unit 140 operates, and the second cutting-in vehicle identification unit 150 stops operating.

The "same direction as that of the own vehicle M" is not limited to exactly the same direction as a direction in which the own vehicle M is traveling, and may be a direction matching a direction in which a vehicle is generally traveling in a lane in which the own vehicle M is traveling.

First Cutting-in Vehicle Identification Unit

The first cutting-in vehicle identification unit 140 includes, for example, a cutting-in vehicle candidate extraction unit 141, a horizontal position recognition unit 142, a threshold value determining unit 143, and a first determination unit 144. The first cutting-in vehicle identification unit 140 performs preliminary determination (first-stage determination) and main determination (second-stage determination). A vehicle determined as being a cutting-in vehicle in the preliminary determination will be referred to as a preliminary cutting-in vehicle, and a vehicle determined as being a cutting-in vehicle in the main determination will be referred to as a cutting-in vehicle.

Figure 3:
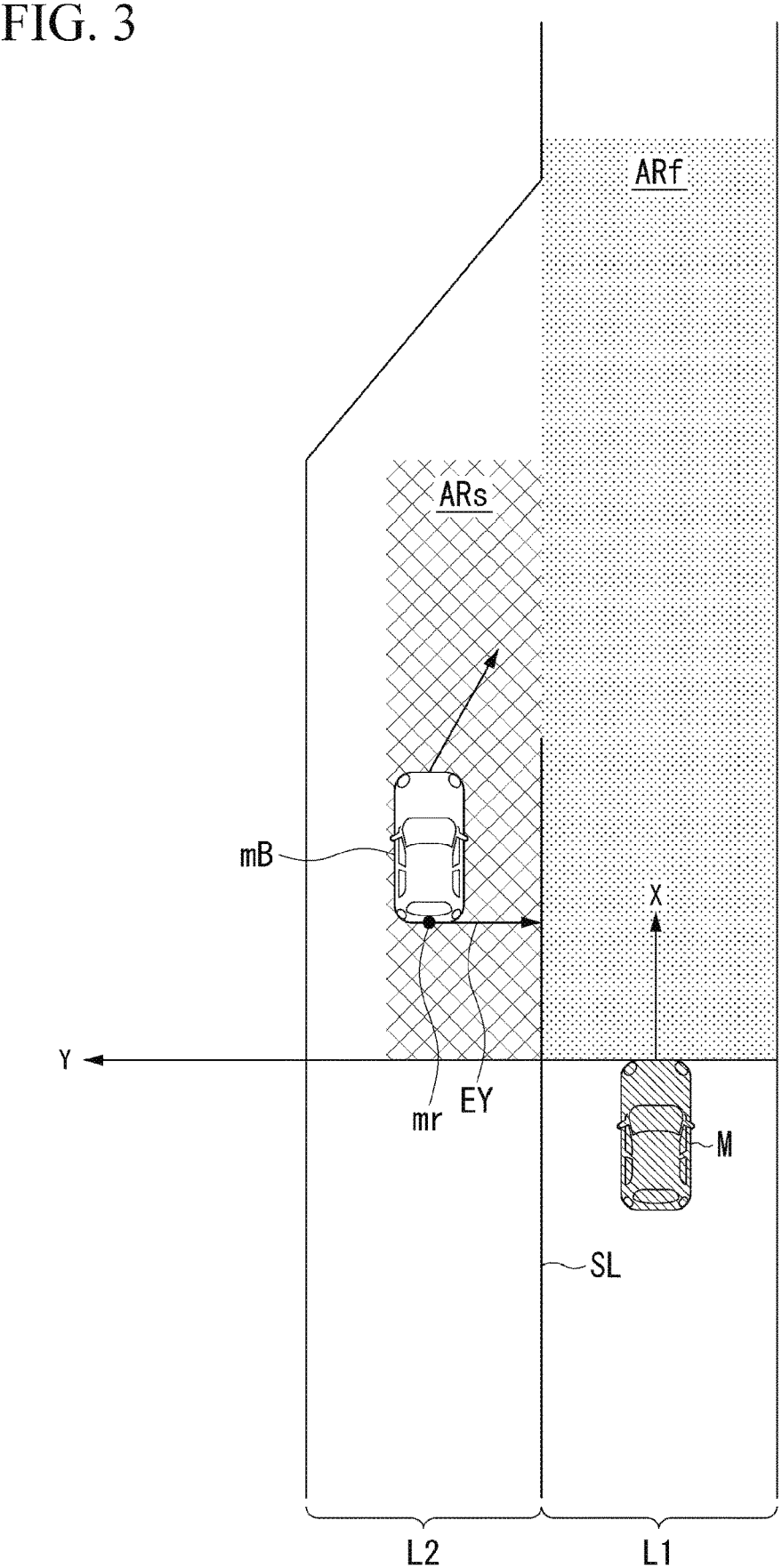
FIG. 3 is a diagram exemplifying a front reference region ARf and a side reference region ARs.

The cutting-in vehicle candidate extraction unit 141 extracts another vehicle present in a side reference region that extends to the side of a traveling lane as a preliminary cutting-in vehicle or a candidate vehicle for a cutting-in vehicle (that is, a cutting-in vehicle candidate). FIG. 3 is a diagram exemplifying a front reference region ARf and a side reference region ARs. The front reference region ARf and the side reference region ARs are regions set on lanes according to the number of lanes included in map information (for example, the second map information 62), relative positions between a lane in which the own vehicle M is traveling and an adjacent lane, and information indicating a width of a lane, and are target regions from which the cutting-in vehicle candidate extraction unit 141 extracts another vehicle.

The cutting-in vehicle candidate extraction unit 141 sets the front reference region ARf having a width matching a width of a lane L1 in which the own vehicle M is traveling and having a fixed length in front of the own vehicle M from a front end part thereof. The side reference region ARs is set in a region adjacent to the lane L1. The adjacent region may include only a lane (a lane L2 in FIG. 3) which is adjacent to the lane L1 and of which a traveling direction is the same as that of the lane L1, and may include a road shoulder portion. The cutting-in vehicle candidate extraction unit 141 sets the side reference region ARs with a shorter length than that of the front reference region ARf toward the side in front from the front end part of the own vehicle M. However, the side reference region ARs may be longer than the front reference region ARf depending on conditions of setting the front reference region ARf. The cutting-in vehicle candidate extraction unit 141 sets both of a length and a width of the side reference region ARs to be fixed. For example, the length may be set to about 100 m, and the width may be set to about one and several tenths of meters.

Hereinafter, it is assumed that the lane L2 is a lane adjacent to the left side of the lane L1, and is a merging lane that merges with the lane L1. In this case, the side reference region ARs may be a region having a length up to a position where the lane L2 disappears due to merging.

In a case where information used to set the front reference region ARf and the side reference region ARs is not included in the map information, the cutting-in vehicle candidate extraction unit 141 recognizes the side in front of the own vehicle M and the left side of the own vehicle M on the basis of an image captured by the camera 10, and sets the front reference region ARf and the side reference region ARs on the basis of the number of recognized lanes or a width of a lane.

Only in a case where there is a lane in a region (that is, the side reference region ARs) of a cutting-in source, the cutting-in vehicle candidate extraction unit 141 extracts another vehicle present in the region as a cutting-in vehicle candidate. For example, in a case where it is determined that the side reference region ARs is not present on the left side of the own vehicle M on the basis of a position of the own vehicle M identified by the GNSS receiver 51 and the second map information 62, or in a case where the lane L2 is not recognized in an image captured by the camera 10, the cutting-in vehicle candidate extraction unit 141 may not perform a process of extracting another vehicle as a cutting-in vehicle candidate.

The horizontal position recognition unit 142 recognizes a horizontal position of the vehicle extracted as a cutting-in vehicle candidate. In FIG. 3, another vehicle mB is a cutting-in vehicle candidate, and EY indicates a horizontal position recognized by the horizontal position recognition unit 142. The horizontal position EY is a distance between a road lane marking SL partitioning the lane L1 in which the own vehicle M is traveling from the lane L2 including the side reference region ARs, and a representative point mr of a cutting-in vehicle candidate. The representative point mr is, for example, the center or the centroid of a rear end part of a cutting-in vehicle candidate in a vehicle width direction. The horizontal position recognition unit 142 periodically and repeatedly recognizes the horizontal position EY, and stores the horizontal position EY in a memory. Hereinafter, a horizontal position recognized at an observation time (in the present processing cycle) by the horizontal position recognition unit 142 will be indicated by $EY0$, a horizontal position recognized one cycle before will be indicated by $EY1$, . . . , and a horizontal position recognized n cycles before will be indicated by $EYn$ (where n is 0 or a natural number). A reference position for obtaining the horizontal position EY may be any target that stands still, such as the center of the lane L2, instead of the road lane marking SL. A reference position for obtaining the horizontal position EY may be any location in the own vehicle M.

In a case where a horizontal movement amount of a cutting-in vehicle candidate moving toward the lane L1 in the road width direction and present in the side reference region ARs exceeds a threshold value in a predetermined period, the first cutting-in vehicle identification unit 140 identifies the cutting-in vehicle candidate as a preliminary cutting-in vehicle or a cutting-in vehicle. In this case, the first determination unit 144 determines whether or not the horizontal movement amount exceeds the threshold value in each of a plurality of predetermined periods in which amounts of dating back from the observation time are different from each other. The phrase "a number of cycles before" is an example of an "amount of dating back from the observation time". $EY0$, $EY1$, . . . , and $EYn$ are examples of "horizontal movement amounts of a cutting-in vehicle candidate moving toward the lane L1 in the road width direction and present in the side reference region ARs in a plurality of predetermined periods in which amounts of dating back from the observation time are different from each other".

Figure 4:
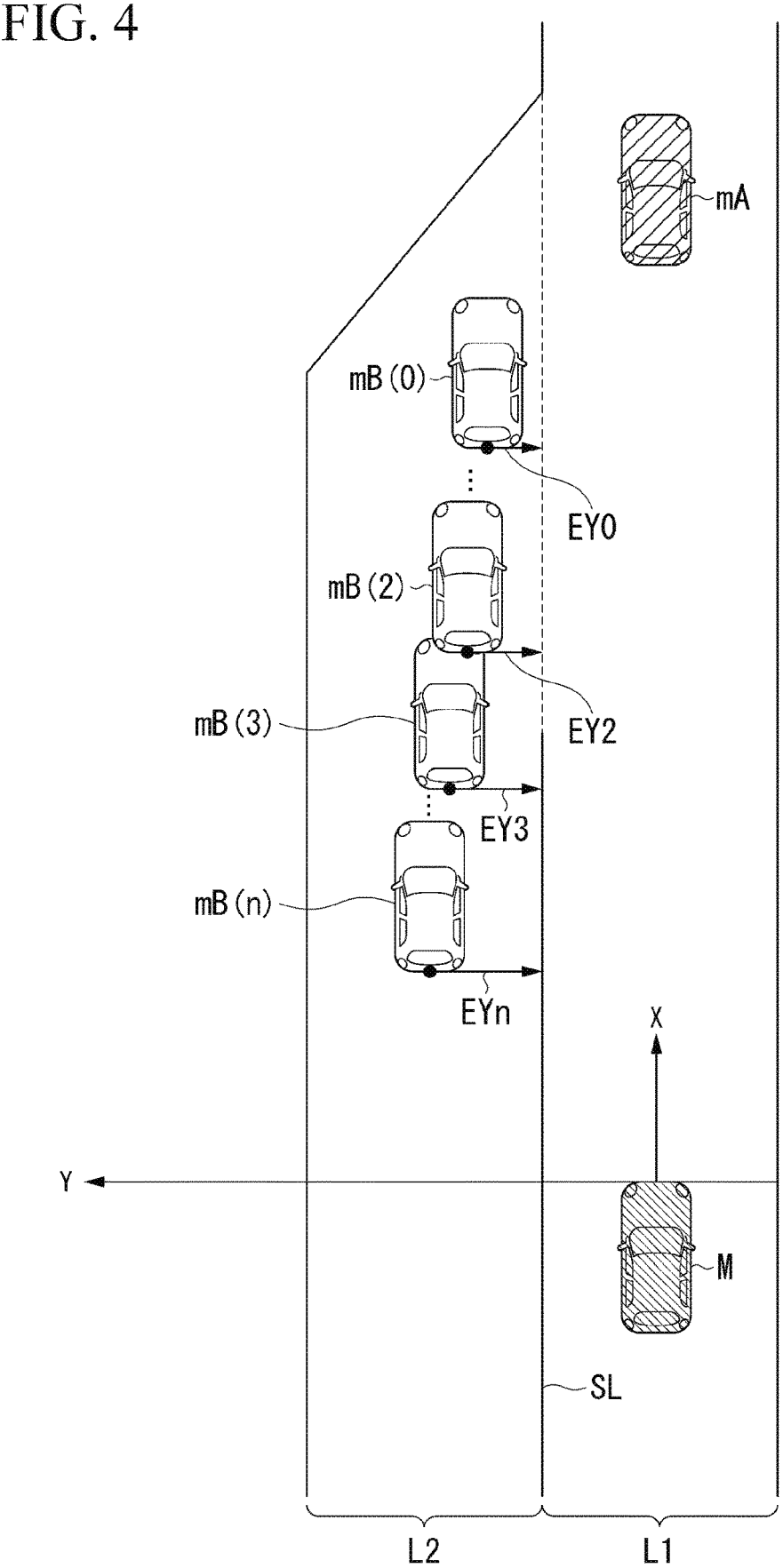
FIG. 4 is a diagram for describing a change amount iEYn of a horizontal position EY.

FIG. 4 is a diagram for describing a change amount $iEYn$ of the horizontal position EY. In FIG. 4, mB(0) indicates a cutting-in vehicle candidate recognized at an observation time, mB(2) indicates the cutting-in vehicle candidate recognized in a processing cycle corresponding to two cycles before the observation time, mB(3) indicates the cutting-in vehicle candidate recognized in a processing cycle corresponding to three cycles before the observation time, and mB(n) indicates the cutting-in vehicle candidate recognized in a processing cycle corresponding to n cycles before the observation time. EY0 indicates a horizontal position of the cutting-in vehicle candidate mB(0) recognized at the observation time, EY2 indicates a horizontal position of the cutting-in vehicle candidate mB(2) recognized in the processing cycle corresponding to two cycles before the observation time, EY3 indicates a horizontal position of the cutting-in vehicle candidate mB(3) recognized in the processing cycle corresponding to three cycles before the observation time, and EYn indicates a horizontal position of the cutting-in vehicle candidate mB(n) recognized in the processing cycle corresponding to n cycles before the observation time. The change amount iEYn of the horizontal position EY is defined by Equation (1).

$$iEYn = EYn - EY0 \quad (1)$$

The horizontal position recognition unit 142 computes iEYn with respect to, for example, n=2, 3, and 5. In other words, iEY2, iEY3, and iEY5 are computed. A method of selecting such numbers is only an example, and any natural number of 2 or greater may be selected from among natural numbers, and, in the following description, 2, 3, and 5 are assumed to be selected.

The threshold value determining unit 143 determines respective threshold values with respect to n=2, 3, and 5. The threshold value determining unit 143 sets a threshold value $\alpha$ (an example of a first threshold value) for preliminary determination (first-stage determination) and a threshold value $\beta$ (an example of a second threshold value) for main determination (second-stage determination). The threshold values $\alpha$ and $\beta$ are set with respect to each of n=2, 3, and 5 in correspondence with the preliminary determination and the main determination, and thus six threshold values are set. Hereinafter, a threshold value used for preliminary determination and corresponding to n=2 will be indicated by $\alpha 2$, a threshold value used for preliminary determination and corresponding to n=3 will be indicated by $\alpha 3$, a threshold value used for preliminary determination and corresponding to n=5 will be indicated by $\alpha 5$, a threshold value used for main determination and corresponding to n=2 will be indicated by $\beta 2$, a threshold value used for main determination and corresponding to n=3 will be indicated by $\beta 3$, and a threshold value used for main determination and corresponding to n=5 will be indicated by $\beta 5$.

The first determination unit 144 determines whether or not iEYn is equal to or more than a threshold value $\alpha n$ with respect to each of n=2, 3, and 5 as an identification process at a first stage. In a case where, among a plurality of determination results, determination results of a predetermined number k or more show that "the horizontal movement amount iEYn is more than the threshold value $\alpha n$", the first determination unit 144 identifies the cutting-in vehicle candidate as a preliminary cutting-in vehicle. The first determination unit 144 determines whether or not iEYn is equal to or more than a threshold value $\beta n$ with respect to each of n=2, 3, and 5 as an identification process at a second stage. In a case where, among a plurality of determination results, determination results of a predetermined number k or more show that "the horizontal movement amount iEYn is more than the threshold value $\beta n$", the cutting-in vehicle candidate is identified as a cutting-in vehicle. The predetermined number k is, for example, 1, but may be 2 or greater.

The following traveling control unit 162 generates, for example, trajectory points such that strong braking is performed in relation to another vehicle identified as a cutting-in vehicle and a preliminary cutting-in vehicle, compared with other vehicles not identified as a cutting-in vehicle and a preliminary cutting-in vehicle. Details thereof will be described later.

Figure 5:
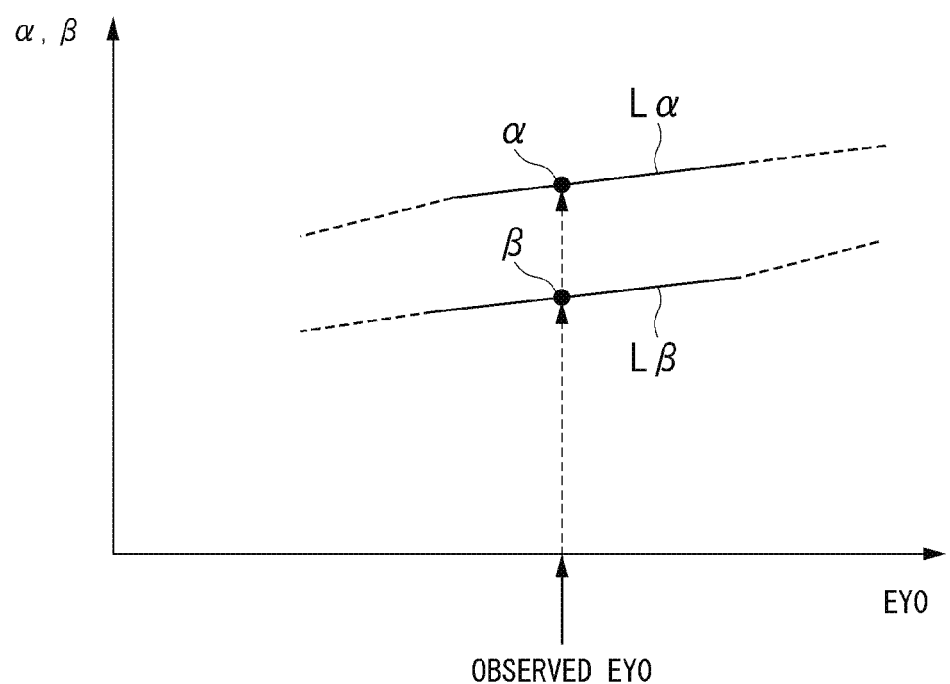
FIG. 5 is a diagram illustrating an example of a content of a threshold value determination map.

The threshold value determining unit 143 determines the threshold values $\alpha$ and $\beta$ by using a threshold value determination map 145. FIG. 5 is a diagram illustrating an example of a content of the threshold value determination map 145. As illustrated, the threshold value determination map 145 is information defining characteristic lines L$\alpha$ and L$\beta$ used to determine the threshold values $\alpha$ and $\beta$ corresponding to the horizontal position EY0. The threshold value determining unit 143 acquires values corresponding to the horizontal position EY0 observed in the present processing cycle from the characteristic lines L$\alpha$ and L$\beta$, and sets the values as the threshold values $\alpha$ and $\beta$, respectively. The threshold value determination map 145 is created in advance with respect to each of n=2, 3, and 5, and the threshold value determining unit 143 acquires the threshold values $\alpha$ and $\beta$ as described above with respect to each of n=2, 3, and 5.

Figure 6:
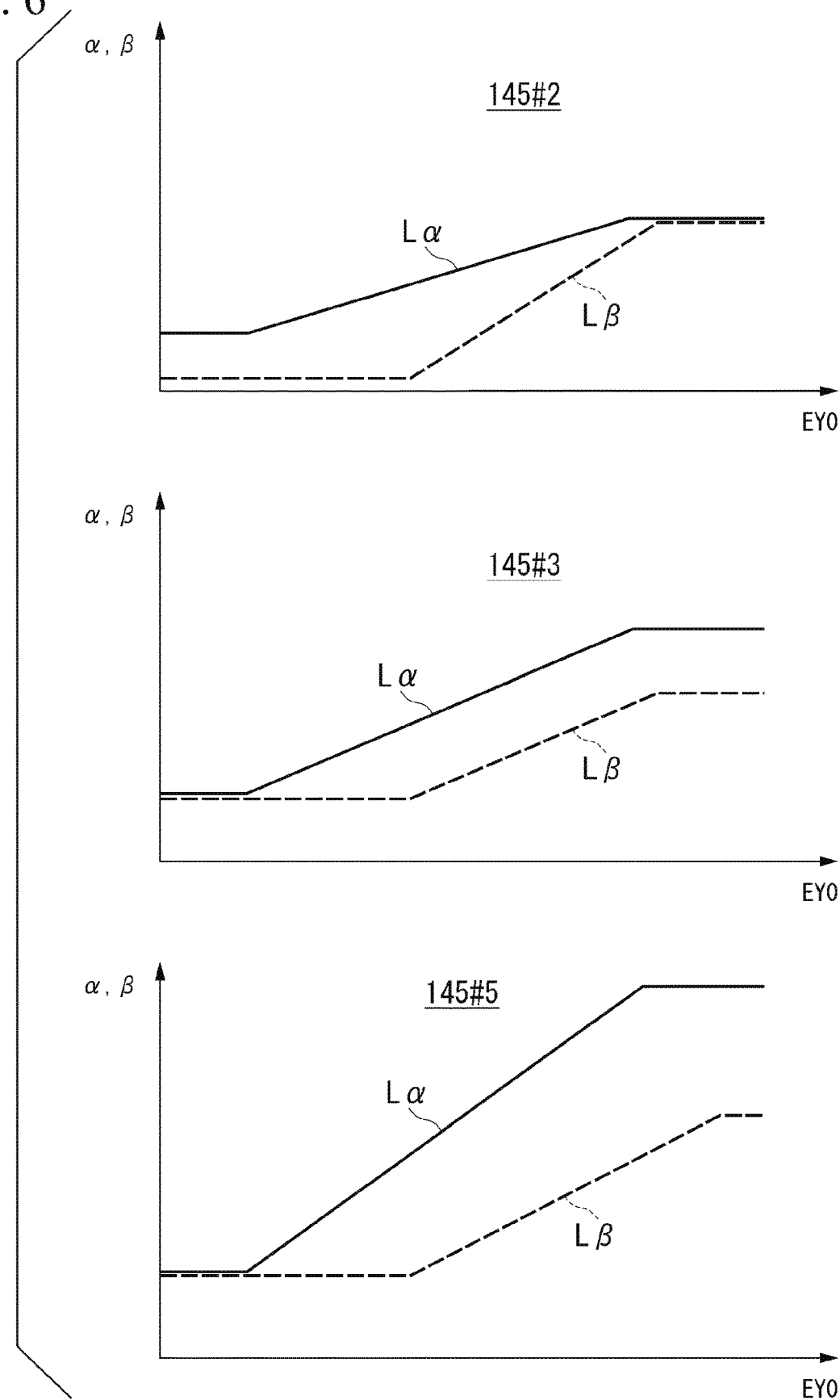
FIG. 6 is a diagram illustrating examples of contents of threshold value determination maps respectively corresponding to n=2, 3, and 5.

FIG. 6 is a diagram illustrating examples of contents of the threshold value determination maps 145 respectively corresponding to n=2, 3, and 5. FIG. 6 illustrates examples of contents of the threshold value determination map 145#2 corresponding to n=2, the threshold value determination map 145#3 corresponding to n=3, and the threshold value determination map 145#5 corresponding to n=5. Such a map may be replaced with a function embedded in a program, and any electronic technique may be employed as long as the same result can be obtained.

The threshold value determination map 145 shows the following overall trends.

(1) Both of the characteristic lines L$\alpha$ and L$\beta$ increase toward the upper right. Therefore, in a case where a cutting-in vehicle candidate is traveling at a position close to the lane L1 in the road width direction, that is, EY0 is small, the threshold value determining unit 143 sets a smaller threshold value than in a case where EY0 is great. As a result, in a case where a cutting-in vehicle candidate is traveling at a position close to the lane L1 in the road width direction, a preliminary cutting-in vehicle or a cutting-in vehicle can be more easily identified even with a small change amount of a horizontal position than in a case where the cutting-in vehicle candidate is traveling at a position distant from the lane L1. Consequently, it is possible to rapidly cope with a change in a horizontal position with respect to another vehicle traveling near an own lane. Another vehicle traveling at a position distant from an own lane is identified as a preliminary cutting-in vehicle or a cutting-in vehicle only in a case where there is a great change in a horizontal position, and thus it is possible to reduce a chance of the occurrence of unnecessary control.

(2) Both of the characteristic lines L$\alpha$ and L$\beta$ shift upward as n increases. Therefore, the threshold value determining unit 143 sets a threshold value in a predetermined period of which an amount of dating back is large (a threshold value in a case where n is great) to be greater than a threshold value in a predetermined period of which an amount of dating back is small (a threshold value in a case where n is small). Consequently, in a case where a sudden change in a horizontal position occurs in another vehicle (iEYn with small n increases), another vehicle can be rapidly identified as a preliminary cutting-in vehicle or a cutting-in vehicle. Regarding a smooth change in a horizontal position, another vehicle is not identified as a preliminary cutting-in vehicle or a cutting-in vehicle unless there is continuity to some extent, and thus it is possible to reduce a chance of the occurrence of unnecessary control.

(3) In a case where n is small, the characteristic lines Lα and Lβ deviate relative to each other on the small EY0 side. As a result, in a case where a cutting-in vehicle candidate is traveling at a position close to the lane L1 in the road width direction, the cutting-in vehicle candidate is rapidly identified as a preliminary cutting-in vehicle. Thus, it is possible to rapidly cope with a behavior of a vehicle close to the own vehicle M.

(4) In a case where n is great, the characteristic lines Lα and Lβ deviate relative to each other on the great EY0 side. As a result, in a case where a cutting-in vehicle candidate is traveling at a position distant from the lane L1 in the road width direction, the cutting-in vehicle candidate is not identified as a cutting-in vehicle as long as a change amount of a horizontal position is not large. Thus, it is possible to suppress frequent occurrence of unnecessary control in relation to a vehicle distant from the own vehicle M.

Figure 7:
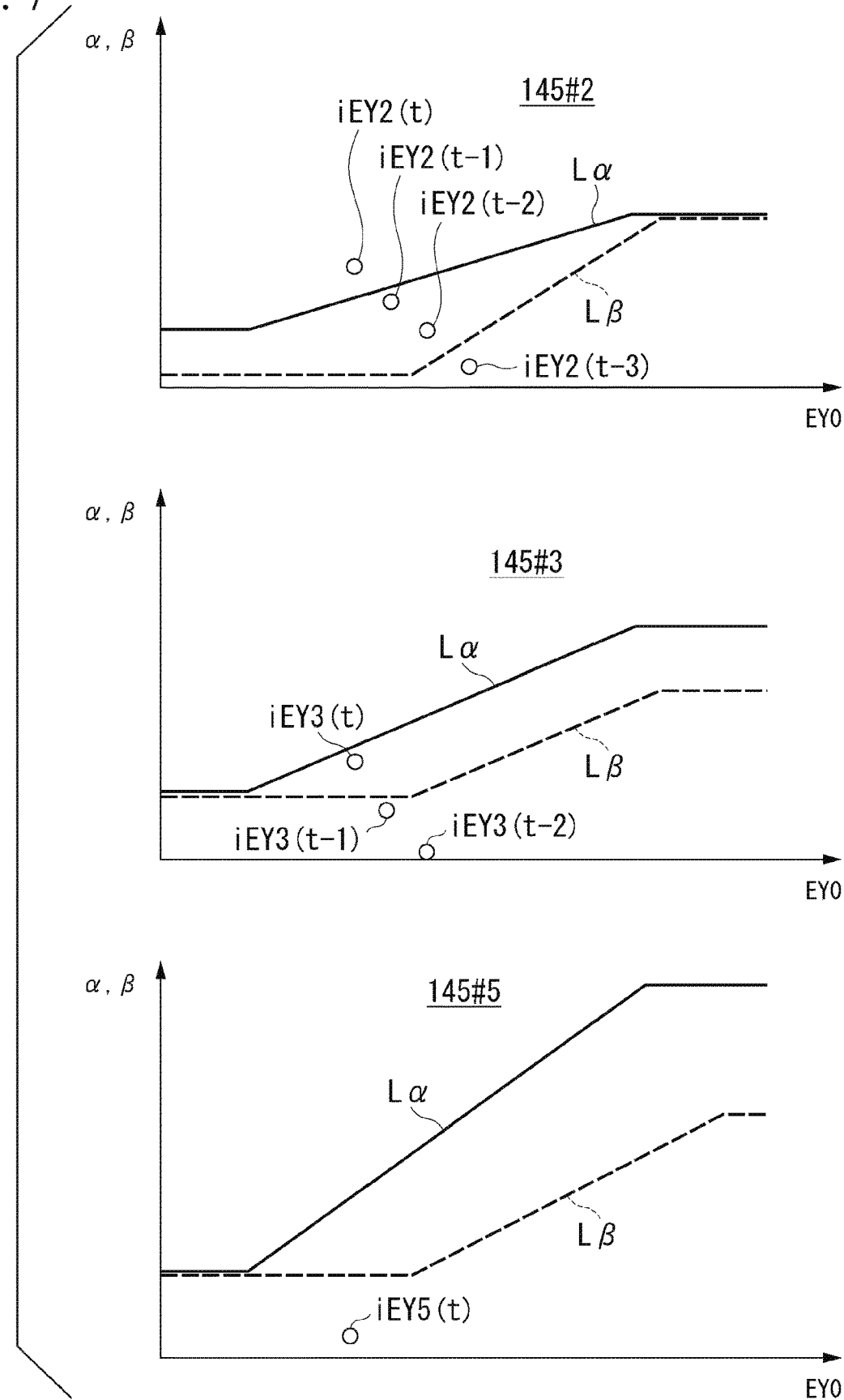
FIG. 7 is a diagram illustrating an example of transition of iEYn of another vehicle that has entered a side reference region from behind of an own vehicle and is already traveling at a position close to a lane L1 at the time of entering the side reference region.
Figure 8:
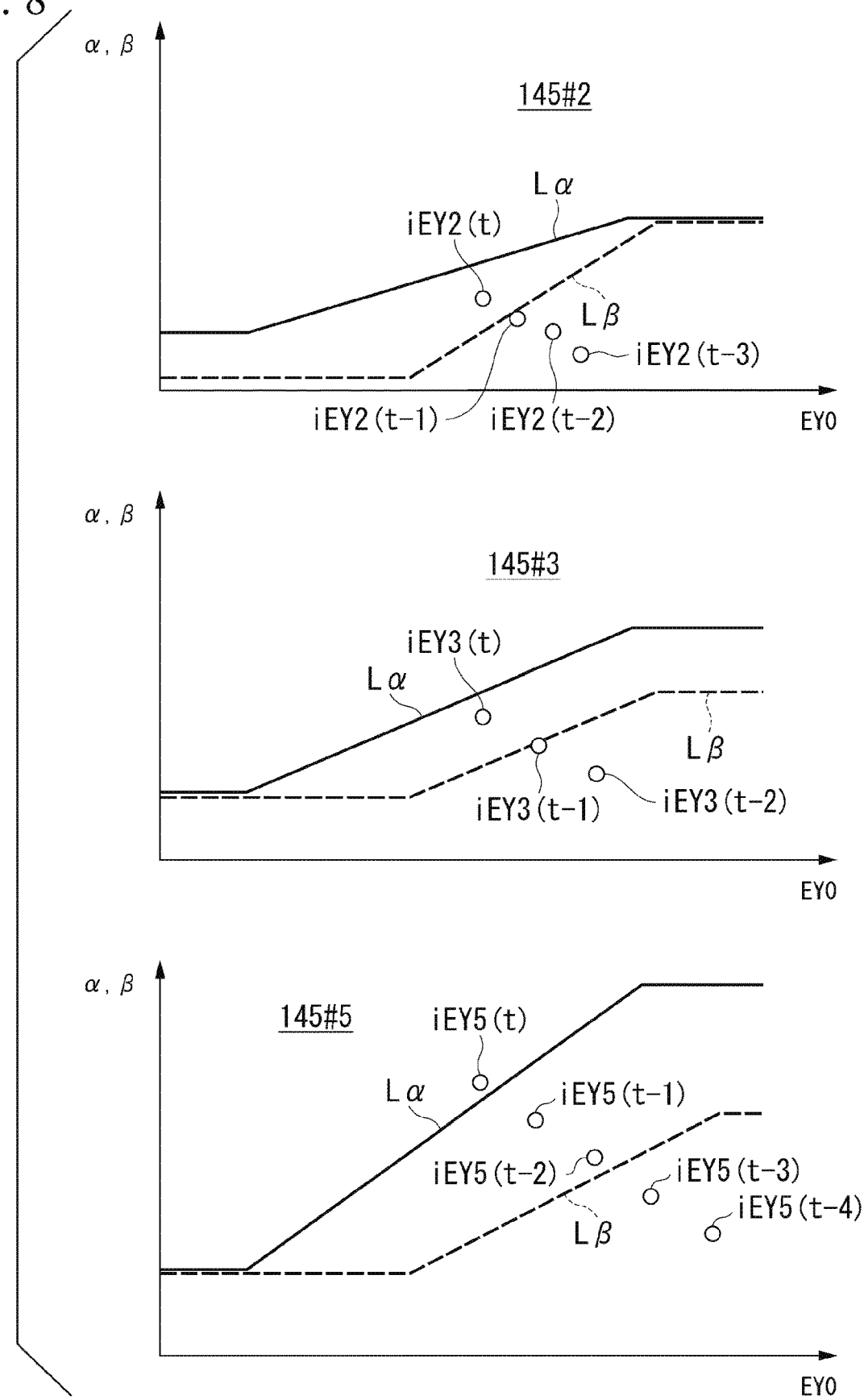
FIG. 8 is a diagram illustrating an example of transition of iEYn of another vehicle that is continuously coming close to the lane L1 from a position distant from the lane L1 in a lane L2.

FIGS. 7 and 8 are diagrams illustrating transition of iEYn corresponding to a supposed cutting-in traveling pattern. In FIGS. 7 and 8, t indicates an observation time, and t-1, t-2, . . . indicate processing cycles corresponding to one cycle, two cycles, . . . before the observation time. FIG. 7 illustrates an example of transition of iEYn of another vehicle that has entered the side reference region ARs from behind of the own vehicle M and is already traveling at a position close to the lane L1 at the time of entering the side reference region ARs. In a case of another vehicle, iEY2 responds with the highest sensitivity and is thus equal to or more than the threshold value α at the observation time t, but iEY3 is less than the threshold value α and is equal to or more than the threshold value β, and iEY5 is still less than the threshold value β.

FIG. 8 illustrates an example of transition of iEYn of another vehicle that is continuously coming close to the lane L1 from a distant position from the lane L1 in the lane L2. In a case of such another vehicle, iEY5 responds with the highest sensitivity and is thus equal to or more than the threshold value α at the observation time t, but iEY2 and iEY3 are all less than the threshold value α and are equal to or more than the threshold value β.

As mentioned above, change amounts of a horizontal position are obtained with respect to predetermined periods of which amounts of dating back are different from each other, and are compared with different threshold values, and thus other vehicles with different movement patterns can be appropriately identified as cutting-in vehicles.

Following Traveling Control Unit

Hereinafter, details of the constituents of the action plan generation unit 160 will be described. The following traveling control unit 162 executes a following traveling event of causing the own vehicle M to follow the preceding vehicle mA or a following traveling event of causing the own vehicle M to follow another vehicle mB having entered between the preceding vehicle mA and the own vehicle M from the lane L2. The following traveling control unit 162 generates a target trajectory in the following traveling event such that the own vehicle M travels to follow a vehicle traveling in the same direction as that of the own vehicle M in front of the own vehicle M.

Control State Changing Unit

The control state changing unit 164 changes an aspect of the following traveling event executed by the following traveling control unit 162 to a first operation or a second operation. The first operation is an operation of reducing an inter-vehicle distance between the preceding vehicle mA and the own vehicle M. The second operation is an operation of increasing an inter-vehicle distance between the preceding vehicle mA and the own vehicle M. The following traveling control unit 162 reduces an inter-vehicle distance between the preceding vehicle mA and the own vehicle M according to the first operation in response to an instruction from the control state changing unit 164, and maintains the inter-vehicle distance and causes the own vehicle M to follow the preceding vehicle mA when the inter-vehicle distance reaches a predetermined lower limit value (for example, several tens to several hundreds of centimeters). The following traveling control unit 162 increases an inter-vehicle distance between the preceding vehicle mA and the own vehicle M according to the second operation in response to an instruction from the control state changing unit 164, and maintains the inter-vehicle distance and causes the own vehicle M to follow the preceding vehicle mA when the inter-vehicle distance reaches a predetermined upper limit value (for example, a distance corresponding to about a three-vehicle length). The control state changing unit 164 causes the following traveling control unit 162 to execute a following traveling event according to the second operation, for example, in a case where a cutting-in vehicle candidate is identified as a cutting-in vehicle, and causes the following traveling control unit 162 to execute a following traveling event according to the first operation, for example, in a case where a cutting-in vehicle candidate is identified as a preliminary cutting-in vehicle. The control state changing unit 164 causing the following traveling control unit 162 to execute a following traveling event according to the first operation or the second operation is an example of "performing control during entry".

Figure 9:
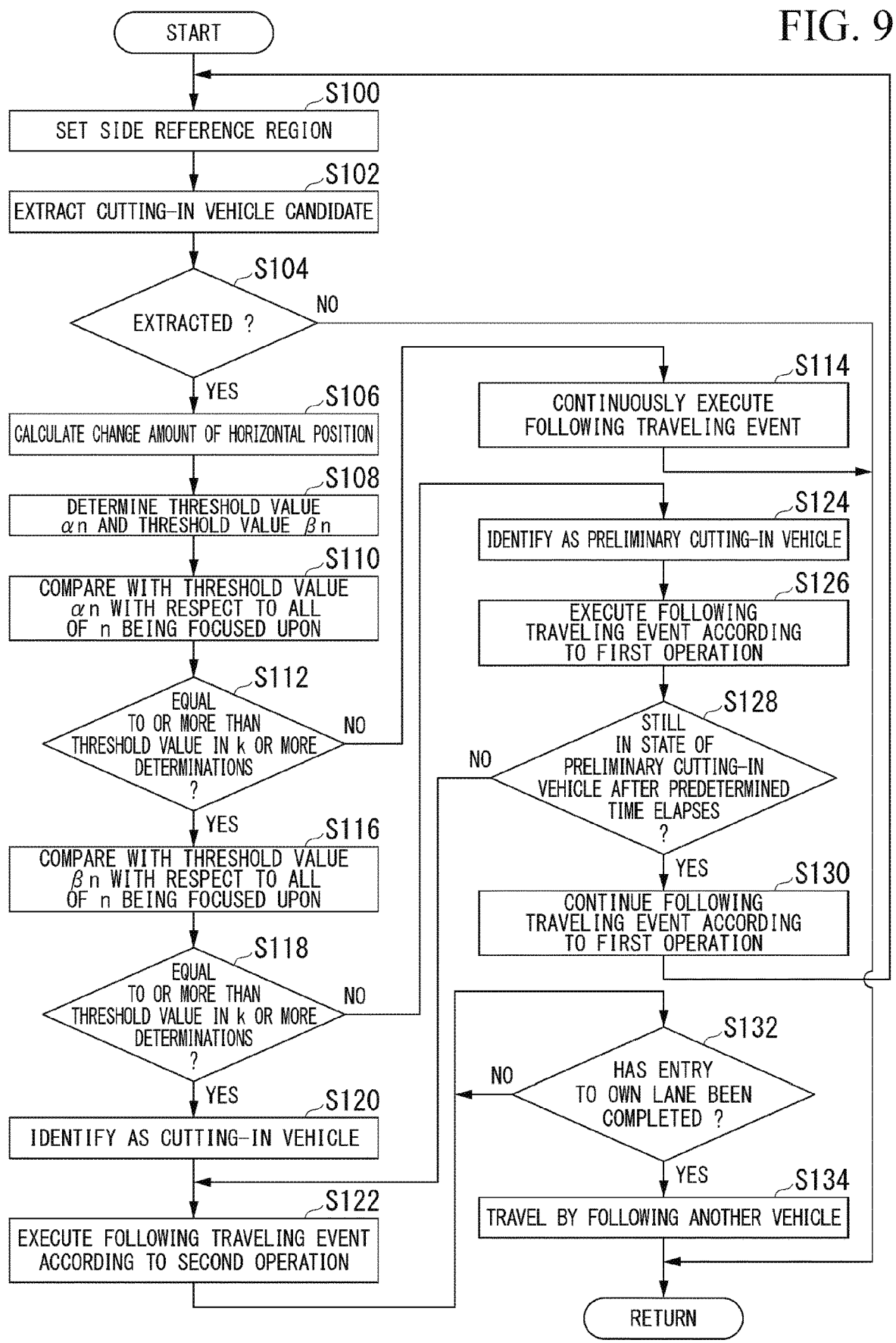
FIG. 9 is a flowchart illustrating an example of a flow of a process executed by a first cutting-in vehicle identification unit.

FIG. 9 is a flowchart illustrating an example of a flow of a process executed by the first cutting-in vehicle identification unit 140. The process in the flowchart is, for example, periodically and repeatedly executed.

First, the cutting-in vehicle candidate extraction unit 141 sets the side reference region ARs (step S100), and extracts a cutting-in vehicle candidate in the side reference region ARs (step S102). The cutting-in vehicle candidate extraction unit 141 determines whether or not one or more cutting-in vehicle candidates have been extracted (step S104). In a case where no cutting-in vehicle candidate has been extracted, a process corresponding to one cycle in the flowchart is finished.

In a case where one or more cutting-in vehicle candidates have been extracted by the cutting-in vehicle candidate extraction unit 141, the horizontal position recognition unit 142 calculates the horizontal position EY0 and the change amount iEYn of the horizontal position of the cutting-in vehicle candidate (step S106). Next, the threshold value determining unit 143 determines the threshold values αn and βn on the basis of the horizontal position EY0 (step S108).

Next, the first determination unit 144 compares the change amount iEYn of the horizontal position with the threshold value αn with respect to all of n being focused upon (in the above example, n=2, 3, and 5) (step S110). The first determination unit 144 determines whether or not the change amount iEYn of the horizontal position is equal to or more than the threshold value αn in k or more determinations (step S112). As described above, k may be 1, and may be 2 or greater. In a case where the first determination unit 144 determines that the change amount iEYn of the horizontal position is not equal to or more than the threshold value αn in k or more determinations, the control state changing unit 164 treats the extracted cutting-in vehicle candidate as not being a cutting-in vehicle or a preliminary cutting-in vehicle, and causes the following traveling control unit 162 to continuously execute a following traveling event, and a process corresponding to one cycle in the flowchart is finished (step S114). Consequently, the control state changing unit 164 can control the own vehicle M such that an automation ratio of the own vehicle M is not reduced due to the presence of another vehicle mB that is extracted as a cutting-in vehicle candidate and is not a cutting-in vehicle or a preliminary cutting-in vehicle.

In a case where the change amount $iEY_n$ of the horizontal position is equal to or more than the threshold value $\alpha_n$ in the k or more determinations, the first determination unit 144 further compares the change amount $iEY_n$ of the horizontal position with the threshold value $\beta_n$ with respect to all of n being focused upon (step S116). The first determination unit 144 determines whether or not the change amount $iEY_n$ of the horizontal position is equal to or more than the threshold value $\beta_n$ in k or more determinations (step S118). In a case where the change amount $iEY_n$ of the horizontal position is equal to or more than the threshold value $\beta_n$ in the k or more determinations, the first determination unit 144 identifies the cutting-in vehicle candidate as a cutting-in vehicle (step S120). The control state changing unit 164 causes the following traveling control unit 162 to execute a following traveling event such that an inter-vehicle distance between the preceding vehicle mA and the own vehicle M is increased (that is, according to the second operation) (step S122). Consequently, the control state changing unit 164 can increase an inter-vehicle distance between the preceding vehicle mA and the own vehicle M such that a cutting-in vehicle easily and safely merges between the preceding vehicle mA and the own vehicle M.

In a case where the change amount $iEY_n$ of the horizontal position is not equal to or more than the threshold value $\beta_n$ in the k or more determinations, the first determination unit 144 identifies the cutting-in vehicle candidate as a preliminary cutting-in vehicle (step S124). The control state changing unit 164 causes the following traveling control unit 162 to execute a following traveling event such that an inter-vehicle distance between the preceding vehicle mA and the own vehicle M is reduced (that is, according to the first operation) (step S126). Consequently, the control state changing unit 164 can reduce an inter-vehicle distance between the preceding vehicle mA and the own vehicle M such that a preliminary cutting-in vehicle does not forcibly merge between the preceding vehicle mA and the own vehicle M.

The first determination unit 144 determines whether or not the cutting-in vehicle candidate is still in a state of the preliminary cutting-in vehicle (that is, whether or not there is a change in the change amount $iEY_n$ of the horizontal position calculated by the horizontal position recognition unit 142) after a predetermined time (for example, several seconds to several tenths of seconds) elapses from the following event executed by the following traveling control unit 162 according to the first operation (step S128).

In a case where it is determined that the cutting-in vehicle candidate is not in a state of the preliminary cutting-in vehicle after the predetermined time elapses (for example, in a case where the change amount $iEY_n$ of the horizontal position is equal to or more than the threshold value $\alpha_n$ in the k determinations performed until the predetermined time elapses, and the change amount $iEY_n$ of the horizontal position is equal to or more than the threshold value $\beta_n$ in the k determinations), the control state changing unit 164 causes a following traveling event to be executed according to the second operation assuming that the preliminary cutting-in vehicle starts a behavior as a cutting-in vehicle (step S122). Consequently, the control state changing unit 164 can increase an inter-vehicle distance between the preceding vehicle mA and the own vehicle M such that a cutting-in vehicle easily and safely merges between the preceding vehicle mA and the own vehicle M.

In a case where the preliminary cutting-in vehicle suddenly starts a behavior as a cutting-in vehicle before the predetermined time elapses in step S128, the following traveling control unit 162 may execute a following traveling event according to the second operation without waiting for the predetermined time to elapse. In this case, the following traveling control unit 162 executes following control such that an inter-vehicle distance between the preceding vehicle mA and the own vehicle M is increased according to a change amount of the horizontal position of the preliminary cutting-in vehicle. Consequently, even in a case where a preliminary cutting-in vehicle suddenly enters the lane L1 as a cutting-in vehicle, the following traveling control unit 162 enables the cutting-in vehicle to easily and safely merge between the preceding vehicle mA and the own vehicle M.

In a case where it is determined that the cutting-in vehicle candidate is still in a state of the preliminary cutting-in vehicle after the predetermined time elapses (for example, in a case where the change amount $iEY_n$ of the horizontal position is not equal to or more than the threshold value $\alpha_n$ in the k determinations performed until the predetermined time elapses, or the change amount $iEY_n$ of the horizontal position is not equal to or more than the threshold value $\beta_n$ in the k determinations), the control state changing unit 164 causes the process to proceed to step S100 in a state in which a following traveling event is executed according to the first operation by the following traveling control unit 162 (step S130). Consequently, the control state changing unit 164 can maintain an inter-vehicle distance between the preceding vehicle mA and the own vehicle M to be short such that a preliminary cutting-in vehicle does not forcibly merge between the preceding vehicle mA and the own vehicle M until the preliminary cutting-in vehicle is not extracted as a cutting-in vehicle candidate or starts a behavior as a cutting-in vehicle. In a case where a predetermined time has elapsed or traveling has been performed over a predetermined distance from starting or continuation of the first operation, the control state changing unit 164 regards the cutting-in vehicle as having entered between the preceding vehicle mA and the own vehicle M, and thereafter causes the following traveling control unit 162 to execute a normal following traveling event with another vehicle mB that is the cutting-in vehicle as the preceding vehicle mA.

The following traveling control unit 162 determines whether or not the cutting-in vehicle has entered between the preceding vehicle mA and the own vehicle M in the lane L1 after the following traveling event is executed according to the second operation in step S122 (step S132). In a case where it is determined that the cutting-in vehicle has entered between the preceding vehicle mA and the own vehicle M, the following traveling control unit 162 subsequently executes a normal following traveling event with another vehicle mB that is the cutting-in vehicle as the preceding vehicle mA (step S134). Consequently, the following traveling control unit 162 can smoothly continue a following traveling event.

Modification Example of First Cutting-in Vehicle Identification Unit

In the above description, the threshold values $\alpha$ and $\beta$ are set according to only a horizontal position of another vehicle, but at least one of the threshold values α and β may be determined on the basis of the type or an attribute of another vehicle. The type refers to a two-wheeled vehicle, a four-wheeled vehicle, a special vehicle, and the like, and the attribute refers to a light vehicle, a passenger vehicle, a large vehicle, a truck, and the like. In this case, the object recognition unit 131 recognizes the type or an attribute of another vehicle on the basis of a size of another vehicle or details stated written on a number plate, and transmits the type or the attribute to the first cutting-in vehicle identification unit 140. The threshold value determining unit 143 sets a threshold value to be smaller in relation to, for example, a special vehicle or a large vehicle imparting a great feeling of oppression to an occupant of the own vehicle M when approaching than in relation to other vehicles. The threshold value determining unit 143 sets a threshold value to be smaller in relation to, for example, a two-wheeled vehicle of which a behavior is agile compared with a four-wheeled vehicle, than in relation to a four-wheeled vehicle.

At least one of the threshold values α and β may be determined on the basis of a traveling environment, a traveling state, or a control state of the own vehicle M. The traveling environment is a curvature radius, a gradient, or the like of a road. The traveling state includes, for example, a speed of the own vehicle M. The control state indicates whether, for example, automated driving is executed or driving assistance is executed. The threshold value determining unit 143 sets a threshold value to be smaller, for example, in a case where a curvature radius is small, and a gradient or a speed is high, in comparison with otherwise. The threshold value determining unit 143 sets a threshold value to be smaller in a case where automated driving is executed in comparison with otherwise. A setting range of the side reference region may also be changed on the basis of a traveling environment, a traveling state, or a control state of the own vehicle M.

Second Cutting-in Vehicle Identification Unit

As illustrated in FIG. 2, the second cutting-in vehicle identification unit 150 includes, for example, a cutting-in vehicle candidate extraction unit 151, a vehicle pose recognition unit 152, a preliminary action determination unit 153, and an inhibition region entry determination unit 154. In the same manner as the first cutting-in vehicle identification unit 140, the second cutting-in vehicle identification unit 150 performs preliminary determination (first-stage determination) and main determination (second-stage determination). A vehicle determined as being a cutting-in vehicle in the preliminary determination will be referred to as a preliminary cutting-in vehicle, and a vehicle determined as being a cutting-in vehicle in the main determination will be referred to as a cutting-in vehicle. The preliminary determination and the main determination may be executed in parallel, and thus there may be a vehicle that is identified as a cutting-in vehicle without being identified as a preliminary cutting-in vehicle.

In the same manner as the cutting-in vehicle candidate extraction unit 141, the cutting-in vehicle candidate extraction unit 151 extracts another vehicle present in a side reference region as a preliminary cutting-in vehicle or a candidate vehicle of a cutting-in vehicle (cutting-in vehicle candidate). A side reference region set by the cutting-in vehicle candidate extraction unit 151 may be the same as or different from that set by the cutting-in vehicle candidate extraction unit 141.

The vehicle pose recognition unit 152 recognizes an angle formed between an orientation of a vehicle body of a cutting-in vehicle candidate and a reference direction. The reference direction is, for example, an extension direction of the lane L1 in which the own vehicle M is present. The extension direction of a lane is, for example, a central line of the lane, but may be an extension direction of either of a left or right road lane marking.

Figure 10:
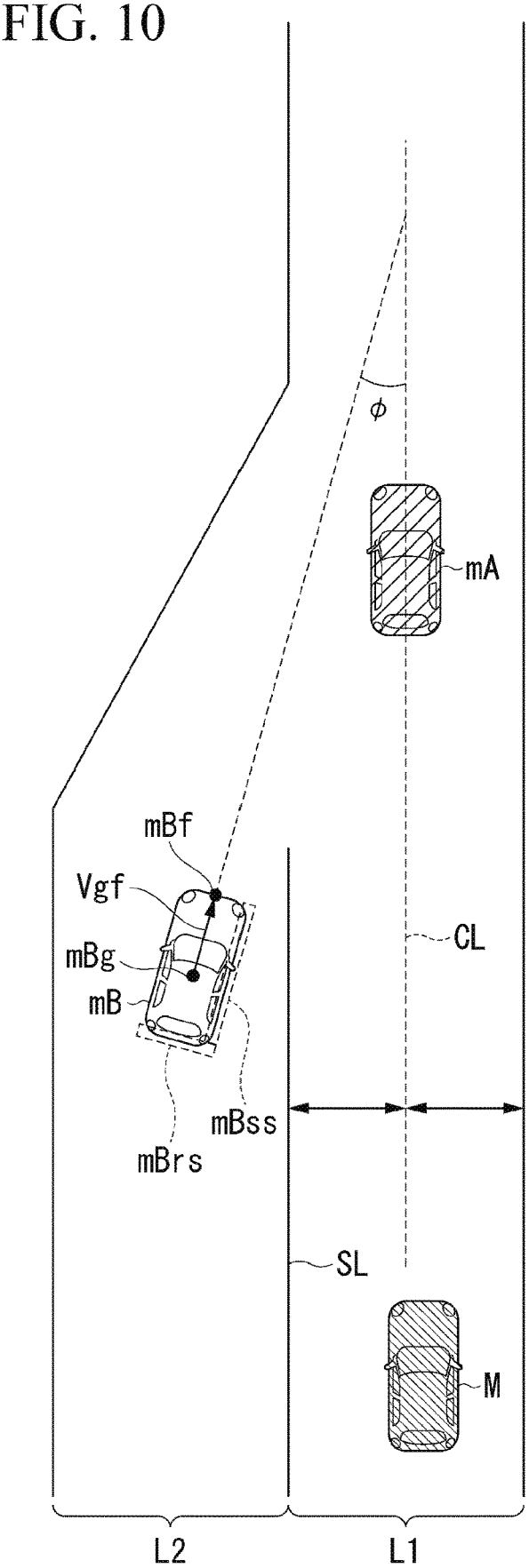
FIG. 10 is a diagram for describing a content of a process in a vehicle pose recognition unit.

FIG. 10 is a diagram for describing a content of a process in the vehicle pose recognition unit 152. In FIG. 10, CL indicates a central line of the lane L1, and a vehicle mB is a cutting-in vehicle candidate. The vehicle pose recognition unit 152 recognizes an orientation of a vehicle body of the vehicle mB on the basis of outputs from on-vehicle sensors such as the camera 10, the radar device 12, and the finder 14, and the object recognition device 16. For example, the vehicle pose recognition unit 152 recognizes a position of a centroid mBg of the vehicle mB and a position of a front end part center mBf on the basis of outputs from on-vehicle sensors such as the camera 10, the radar device 12, and the finder 14, and the object recognition device 16, and recognizes a direction of a vector Vgf directed from the centroid mBg toward the front end part center mBf as an orientation of the vehicle body of the vehicle mB. The centroid mBg may be any location on a central axis instead of the centroid. The front end part center mBf is any location on an outer edge part of the vehicle mB in front of the centroid mBg.

Alternatively, the vehicle pose recognition unit 152 may recognize an extension direction of a side surface mBss of the vehicle mB as an orientation of the vehicle body of the vehicle mB, and may recognize a direction orthogonal to an extension direction of a rear surface mBrs of the vehicle mB in a horizontal plane as an orientation of the vehicle body of the vehicle mB. When the extension direction of the side surface mBss or the extension direction of the rear surface mBrs is recognized, a side surface or a rear surface of a normal vehicle is roundish, and thus the vehicle pose recognition unit 152 may define the extension direction of the side surface by using a certain conversion formula, or may recognize a straight line connecting parts located at symmetric positions to each other as the extension direction of the rear surface. The vehicle pose recognition unit 152 may simply approximate a curved surface or a curve to a plane or a straight line. The vehicle pose recognition unit 152 outputs an angle φ formed between the recognized orientation of the vehicle body and the central line CL of the lane to the preliminary action determination unit 153.

Figure 11:
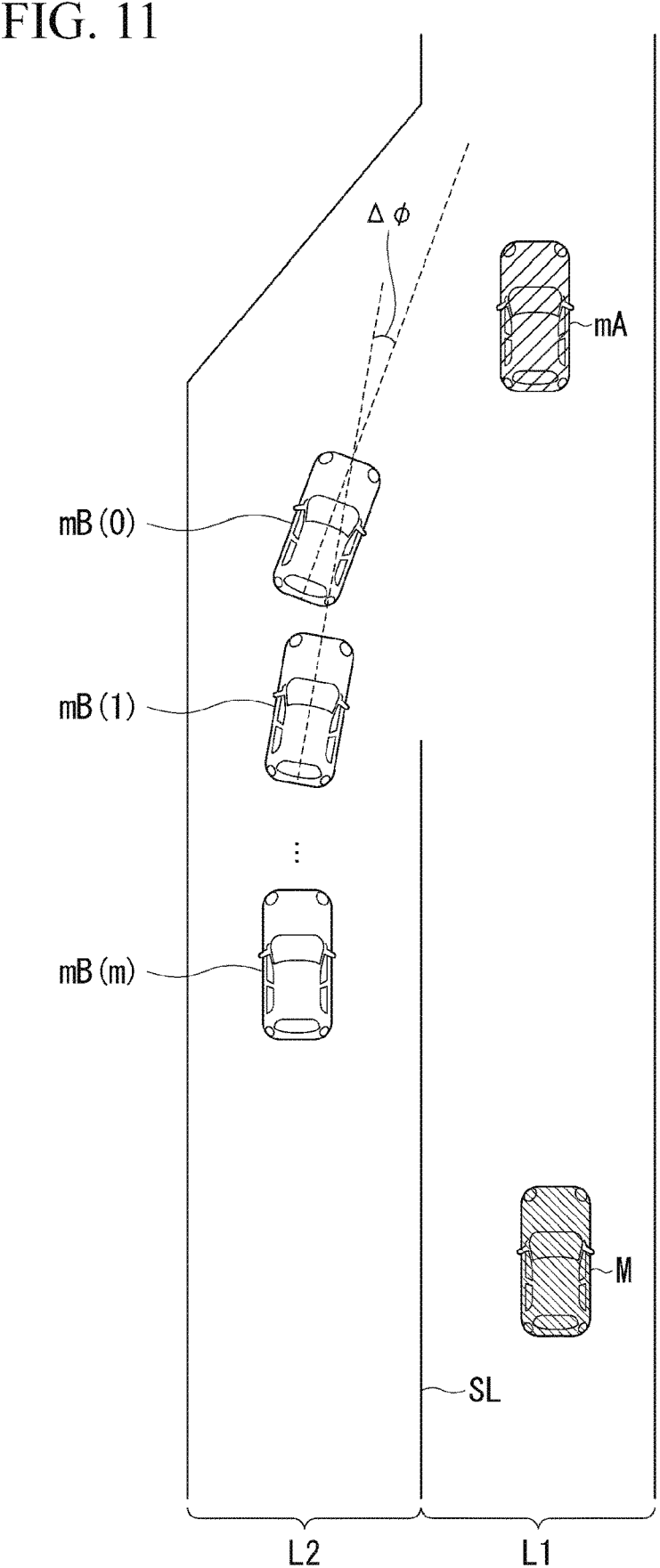
FIG. 11 is a diagram illustrating an example of a behavior of a vehicle identified as a preliminary cutting-in vehicle.

The preliminary action determination unit 153 determines whether or not the cutting-in vehicle candidate is a preliminary cutting-in vehicle on the basis of the angle recognized by the vehicle pose recognition unit 152. For example, in a case where a state in which a change amount Δφ of the angle φ between processing cycles is equal to or more than a threshold value Thφ lasts for m or more cycles, the preliminary action determination unit 153 identifies the cutting-in vehicle candidate as a preliminary cutting-in vehicle. FIG. 11 is a diagram illustrating an example of a behavior of a vehicle identified as a preliminary cutting-in vehicle. In FIG. 11, mB(0) indicates a cutting-in vehicle candidate recognized at an observation time, mB(1) indicates the cutting-in vehicle candidate recognized in a processing cycle corresponding to one cycle before the observation time, and mB(m) indicates the cutting-in vehicle candidate recognized in a processing cycle corresponding to m cycles before the observation time. A cutting-in vehicle candidate showing such a behavior during low-speed traveling does not have a large change amount of a horizontal position, and thus has a high probability of not being identified as a preliminary cutting-in vehicle or a cutting-in vehicle by the first cutting-in vehicle identification unit 140. However, a vehicle that is gradually turning to the lane L1 side during low-speed traveling has a high probability of appealing that the vehicle wants to enter the lane L1, and thus the preliminary action determination unit 153 identifies a cutting-in vehicle candidate performing such a behavior as a preliminary cutting-in vehicle.

The preliminary action determination unit 153 may handle the cutting-in vehicle candidate temporarily identified as a preliminary cutting-in vehicle, as the preliminary cutting-in vehicle until the change amount $\Delta\phi$ of the angle $\phi$ starts to decrease. This is because, in a case where the cutting-in vehicle candidate is at a standstill in a state of having turned to the lane L1, the change amount $\Delta\phi$ is zero, and thus it is not proper to cancel handling of the cutting-in vehicle candidate as a preliminary cutting-in vehicle in this state.

Figure 12:
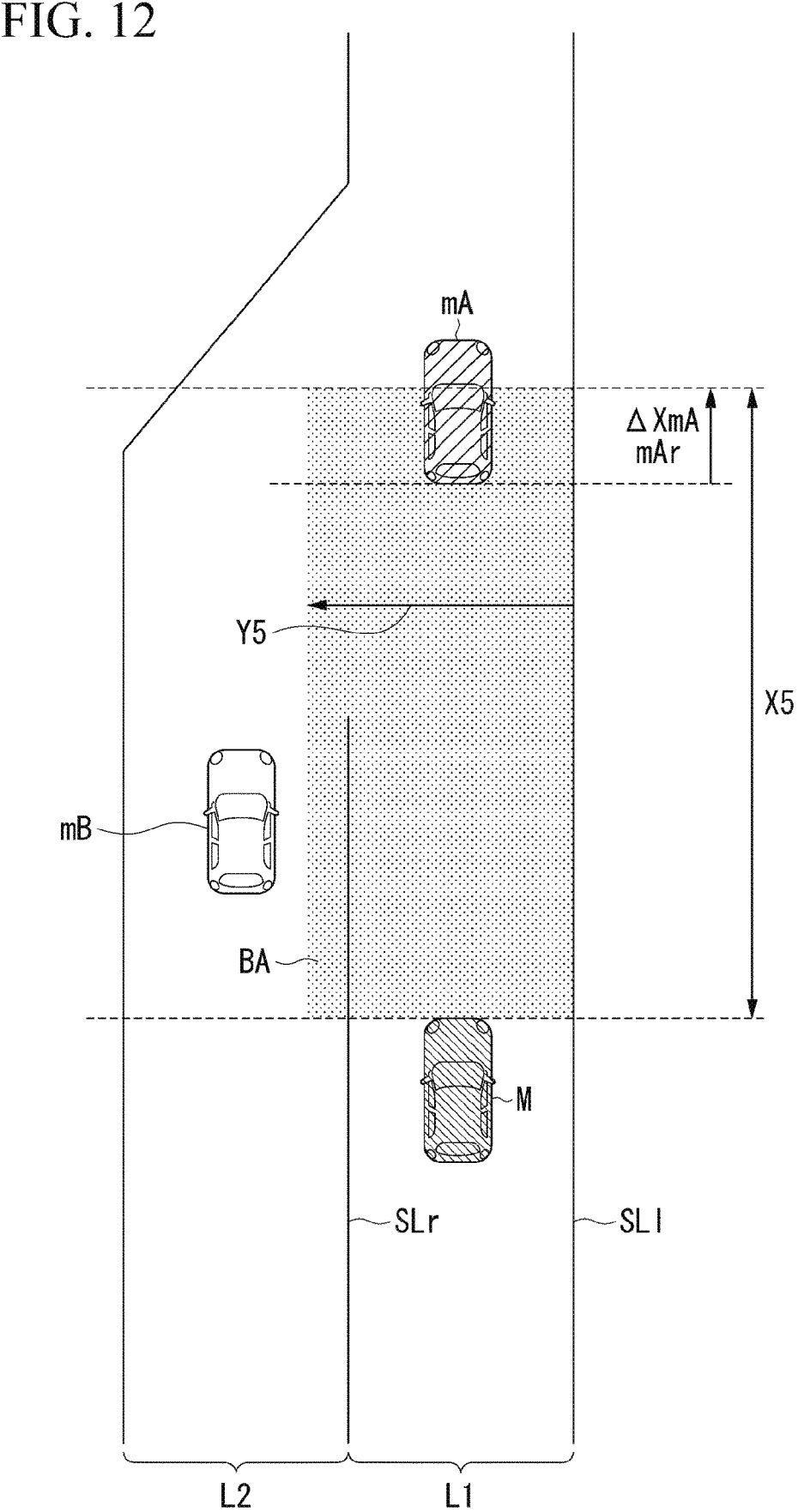
FIG. 12 is a diagram for describing a rule of setting an inhibition region BA.

The inhibition region entry determination unit 154 sets an inhibition region in front of the own vehicle M, and identifies a cutting-in vehicle candidate as a cutting-in vehicle in a case where the cutting-in vehicle candidate enters the inhibition region. FIG. 12 is a diagram for describing a rule of setting an inhibition region BA.

The inhibition region entry determination unit 154 sets the inhibition region BA with, for example, a region occupied by the lane L1 in which the own vehicle M is present as a reference. For example, the inhibition region BA is set to have, as one end, of road lane markings SL1 and SLr partitioning the lane L1, the road lane marking SL1 on an opposite side to the lane L2 in which the side reference region is set, and to reach the inside of the lane L2 across the road lane marking SLr. Therefore, a width Y5 of the inhibition region BA is set in advance to a value more than a general lane width and less than twice the general lane width. In a case where there is a side reference region on the right side of the lane L1, and there is no lane L2 (a region corresponding to the lane L2 is a road shoulder), the inhibition region entry determination unit 154 may reduce a width of the inhibition region BA to a width corresponding to a width of the lane L1.

The inhibition region entry determination unit 154 sets, in principle, a length X5 of the inhibition region BA to a shorter length of a fixed length such as several tens of meters and a length up to a position shifted forward by a traveling amount $\Delta$XmA of the preceding vehicle mA from a rear end part mAr of the preceding vehicle mA right before the own vehicle M in the lane L1. In FIG. 12, X5 is set to the latter length. The inhibition region entry determination unit 154 may set a length of the inhibition region BA on the basis of a traveling environment of the own vehicle M. The traveling environment includes a speed $V_M$ of the own vehicle M. The inhibition region entry determination unit 154 may set the length X5 of the inhibition region BA to become larger as a vehicle length of a cutting-in vehicle candidate becomes larger. This is because, when a vehicle that is long in a front-rear direction such as a trailer cuts in, a position where a rear end part of the vehicle enters the lane L1 is considerably located behind a position where a front end part thereof enters the lane L1.

The inhibition region entry determination unit 154 identifies a cutting-in vehicle candidate of which even a part of a vehicle body enters the inhibition region BA as a cutting-in vehicle. A process in the control state changing unit 164 in a case where a cutting-in vehicle is identified or is not identified by the inhibition region entry determination unit 154 is the same as the above-described process, and thus description thereof will not be repeated.

Figure 13:
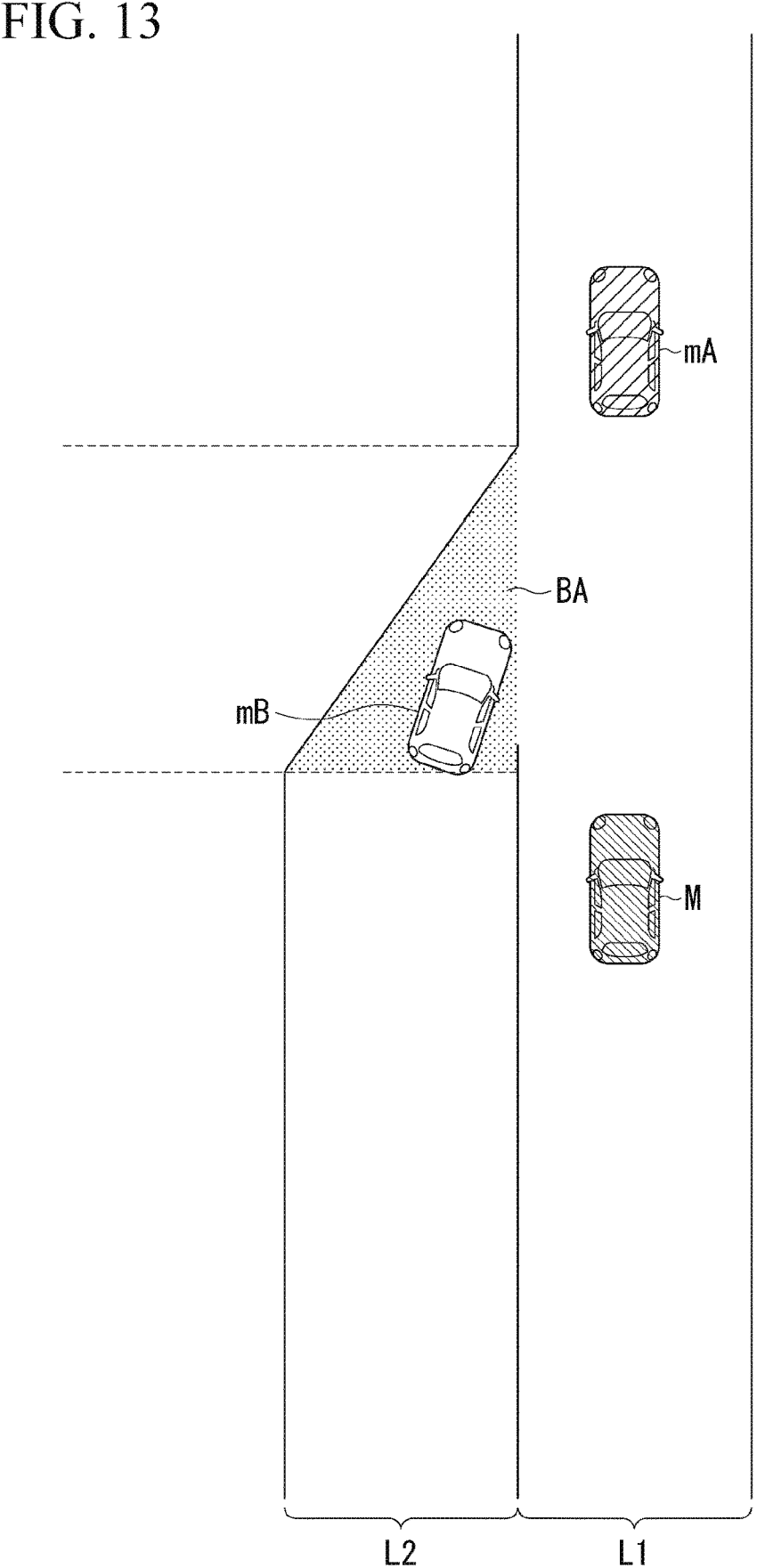
FIG. 13 is a diagram for describing another rule of setting the inhibition region BA.

FIG. 13 is a diagram for describing another rule of setting the inhibition region BA. The inhibition region entry determination unit 154 may set, as the inhibition region BA with respect to the lane L2 that is a merging lane, a region on the lane L2 from a position where a width of the lane L2 starts to be reduced to a position where the lane L2 disappears.

In a case where there is a vehicle identified as a cutting-in vehicle by the second cutting-in vehicle identification unit 150, and the own vehicle M is at a standstill, the following traveling control unit 162 may maintain (may not start) the own vehicle M in the standstill state regardless of a derived target speed. Consequently, it is possible to realize automated driving that is friendly to peripheral vehicles.

There may be a case where both of the first cutting-in vehicle identification unit 140 and the second cutting-in vehicle identification unit 150 identify the same another vehicle as a preliminary cutting-in vehicle or a cutting-in vehicle. In this case, the following traveling control unit 162 may employ, for example, a smaller one of target speeds respectively derived on the basis of both results from the first cutting-in vehicle identification unit 140 and the second cutting-in vehicle identification unit 150 or may employ a greater one of braking forces respectively derived on the basis of both of results therefrom.

Figure 14:
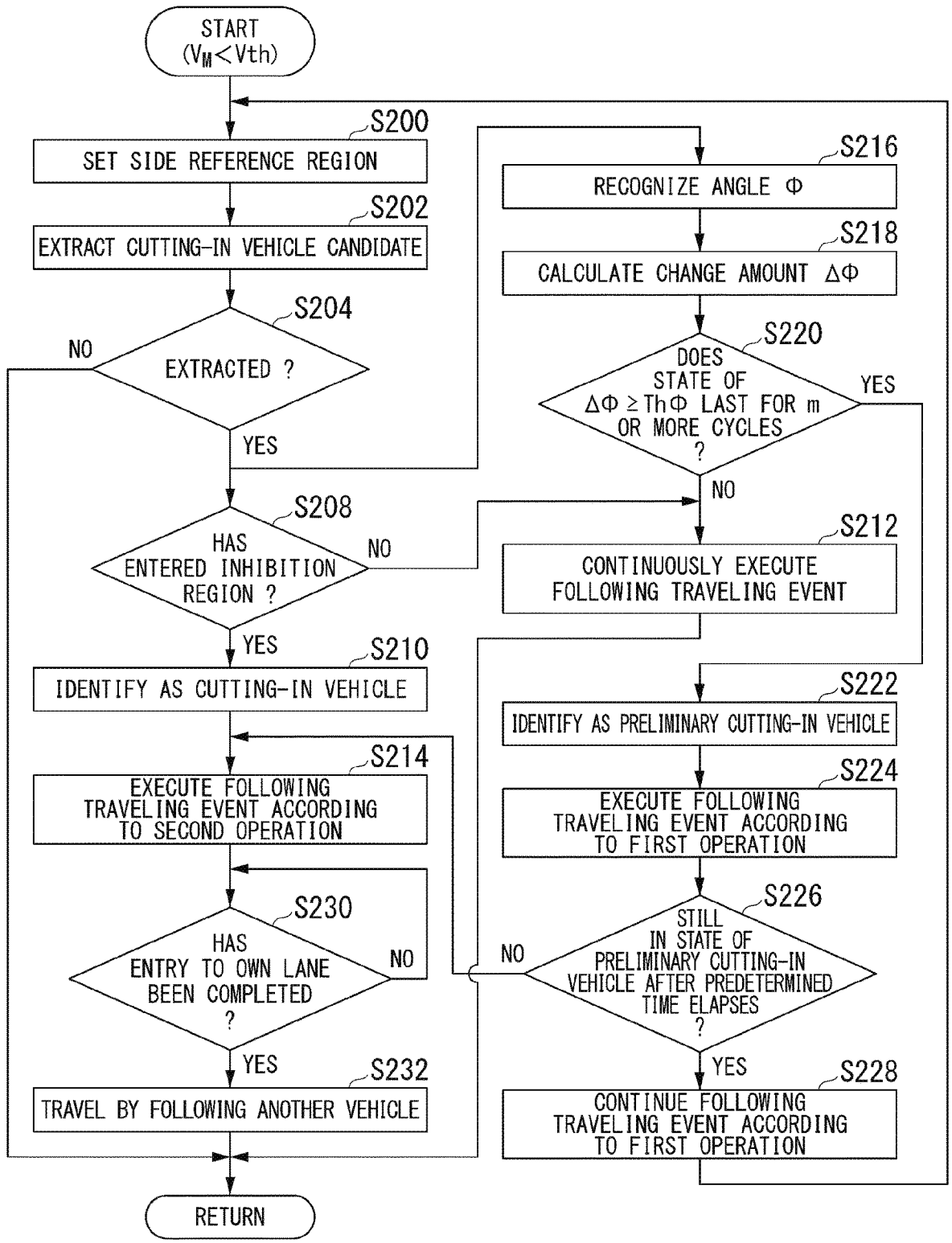
FIG. 14 is a flowchart illustrating an example of a flow of a process executed by a second cutting-in vehicle identification unit.

FIG. 14 is a flowchart illustrating an example of a flow of a process executed by the second cutting-in vehicle identification unit 150. The process in the flowchart is periodically and repeatedly executed, for example, while the speed $V_M$ of the own vehicle M is lower than a predetermined speed Vth.

First, the cutting-in vehicle candidate extraction unit 151 sets a side reference region (step S200), and extracts a cutting-in vehicle candidate in the side reference region (step S202). The cutting-in vehicle candidate extraction unit 151 determines whether or not one or more cutting-in vehicle candidates have been extracted (step S204). In a case where no cutting-in vehicle candidate has been extracted, a process corresponding to one cycle in the flowchart is finished.

In a case where one or more cutting-in vehicle candidates have been extracted by the cutting-in vehicle candidate extraction unit 151, subsequently, the inhibition region entry determination unit 154 performs processes in steps S208 to S210, and the preliminary action determination unit 153 simultaneously performs processes in steps S216 to S222.

The inhibition region entry determination unit 154 identifies whether or not the cutting-in vehicle candidate has entered the inhibition region BA (step S208). In a case where the cutting-in vehicle candidate has entered the inhibition region BA, the inhibition region entry determination unit 154 identifies the cutting-in vehicle candidate as a cutting-in vehicle (step S210). In a case where the inhibition region entry determination unit 154 determines the cutting-in vehicle candidate as not being a cutting-in vehicle, the control state changing unit 164 causes the following traveling control unit 162 to continuously execute a following traveling event, and a process corresponding to one cycle in the flowchart is finished (step S212). In a case where the inhibition region entry determination unit 154 determines the cutting-in vehicle candidate as being a cutting-in vehicle, the control state changing unit 164 treats the extracted cutting-in vehicle candidate as a cutting-in vehicle, and causes the following traveling control unit 162 to execute a following traveling event such that an inter-vehicle distance between the preceding vehicle mA and the own vehicle M is increased (that is, according to the second operation) (step S214). Consequently, the control state changing unit 164 can increase an inter-vehicle distance between the preceding vehicle mA and the own vehicle M such that a cutting-in vehicle easily and safely merges between the preceding vehicle mA and the own vehicle M.

On the other hand, the preliminary action determination unit 153 recognizes the above angle $\phi$ with respect to the cutting-in vehicle candidate (step S216), derives the change amount $\Delta\phi$ of the angle $\phi$ (step S218), and determines whether or not a state in which the change amount $\Delta\phi$ is equal to or more than the threshold value Th$\phi$ lasts for m or more cycles (step S220). In a case where the state in which the change amount $\Delta\phi$ is equal to or more than the threshold value Th$\phi$ lasts for m or more cycles, the preliminary action determination unit 153 identifies the cutting-in vehicle candidate as a preliminary cutting-in vehicle (step S222). In a case where the preliminary action determination unit 153 determines the cutting-in vehicle candidate as not being a preliminary cutting-in vehicle, the control state changing unit 164 causes the following traveling control unit 162 to continuously execute a following traveling event, and a process corresponding to one cycle in the flowchart is finished (step S212).

The control state changing unit 164 causes the following traveling control unit 162 to execute a following traveling event such that an inter-vehicle distance between the preceding vehicle mA and the own vehicle M is reduced (that is, according to the first operation) (step S224). Consequently, the control state changing unit 164 can reduce an inter-vehicle distance between the preceding vehicle mA and the own vehicle M such that a preliminary cutting-in vehicle does not forcibly merge between the preceding vehicle mA and the own vehicle M.

The preliminary action determination unit 153 determines whether or not the cutting-in vehicle candidate is still in a state of the preliminary cutting-in vehicle (that is, whether or not the state in which the change amount $\Delta\phi$ of the angle $\phi$ is equal to or more than the threshold value Th$\phi$ lasts for m or more cycles in a process performed by the vehicle pose recognition unit 152 until a predetermined time elapses) after the predetermined time (for example, several seconds to several tenths of seconds) elapses from the following event executed by the following traveling control unit 162 according to the first operation (step S226).

In a case where it is determined that the cutting-in vehicle candidate is not in a state of the preliminary cutting-in vehicle after the predetermined time elapses (for example, in a case where the state in which the change amount $\Delta\phi$ of the angle $\phi$ is equal to or more than the threshold value Th$\phi$ lasts for m or more cycles in the process performed by the vehicle pose recognition unit 152 until the predetermined time elapses), the control state changing unit 164 causes a following traveling event to be executed according to the second operation assuming that the preliminary cutting-in vehicle starts a behavior as a cutting-in vehicle (step S214). Consequently, the control state changing unit 164 can increase an inter-vehicle distance between the preceding vehicle mA and the own vehicle M such that a cutting-in vehicle easily and safely merges between the preceding vehicle mA and the own vehicle M.

In a case where the preliminary cutting-in vehicle suddenly starts a behavior as a cutting-in vehicle before the predetermined time elapses in step S226, the following traveling control unit 162 may execute a following traveling event according to the second operation without waiting for the predetermined time to elapse.

In a case where it is determined that the cutting-in vehicle candidate is still in a state of the preliminary cutting-in vehicle after the predetermined time elapses (for example, in a case where the state in which the change amount $\Delta\phi$ of the angle $\phi$ is equal to or more than the threshold value Th$\phi$ does not continue for m or more cycles in the process performed by the vehicle pose recognition unit 152 until the predetermined time elapses), the control state changing unit 164 causes the process to proceed to step S200 in a state in which a following traveling event is executed according to the first operation by the following traveling control unit 162 (step S228). Consequently, the control state changing unit 164 can maintain an inter-vehicle distance between the preceding vehicle mA and the own vehicle M to be short such that a preliminary cutting-in vehicle does not forcibly merge between the preceding vehicle mA and the own vehicle M until the preliminary cutting-in vehicle is not extracted as a cutting-in vehicle candidate or starts a behavior as a cutting-in vehicle.

The following traveling control unit 162 determines whether or not the cutting-in vehicle has entered between the preceding vehicle mA and the own vehicle M in the lane L1 after the following traveling event is executed according to the second operation in step S214 (step S230). In a case where it is determined that the cutting-in vehicle has entered between the preceding vehicle mA and the own vehicle M, the following traveling control unit 162 subsequently executes a normal following traveling event with another vehicle mB that is the cutting-in vehicle as the preceding vehicle mA (step S232). Consequently, the following traveling control unit 162 can smoothly continue a following traveling event.

According to the embodiment described above, the automated driving control device 100 enables the own vehicle M to perform an appropriate behavior according to a behavior of another vehicle entering an own lane (lane L1). As a result, it is possible to suppress cutting-in of other vehicles mB while giving priority to another vehicle mB attempting to enter an own lane forcibly, and thus an occupant's convenience is improved.

Modification Example of Embodiment

Figure 15:
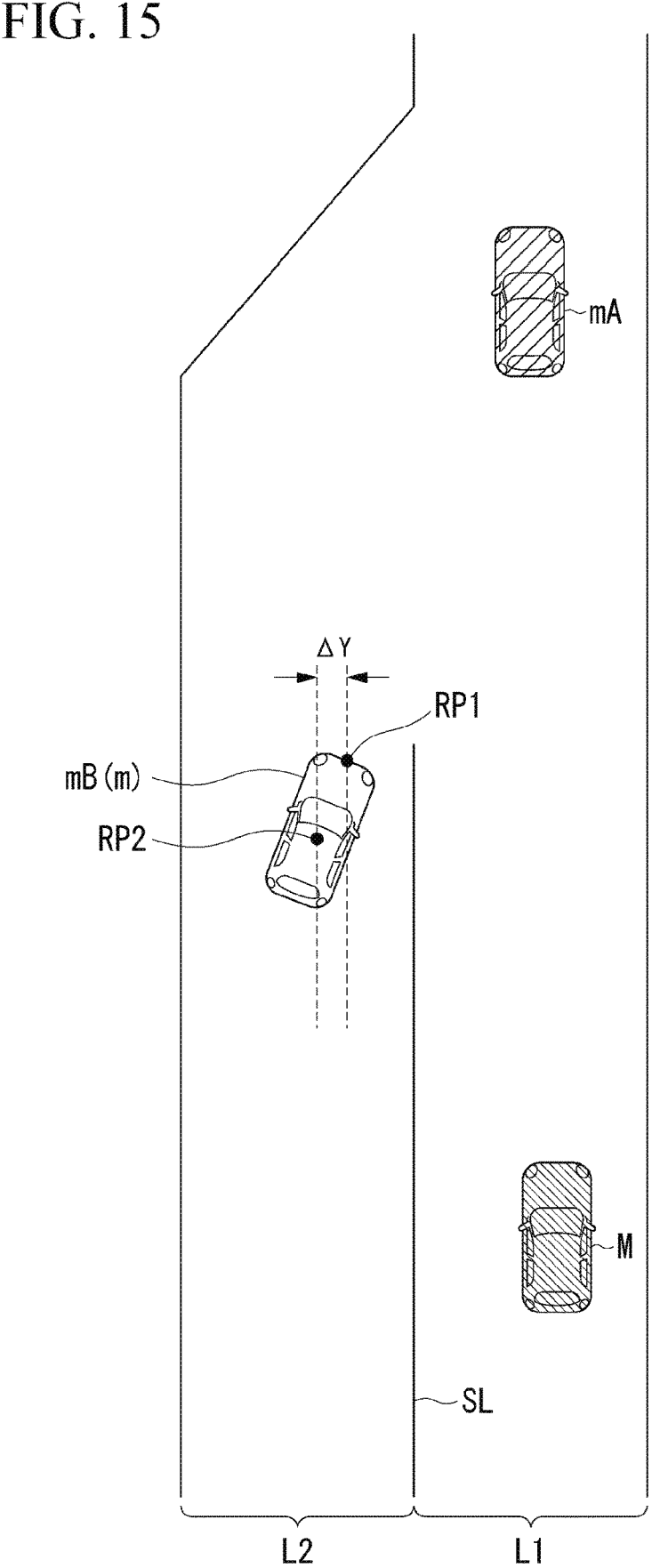
FIG. 15 is a diagram for describing a process in a vehicle pose recognition unit related to a modification example.

The vehicle pose recognition unit 152 may recognize a difference between horizontal positions of a first reference point and a second reference point of a cutting-in vehicle candidate instead of recognizing the above angle $\phi$. The first reference point is, for example, the front end part center, and the second reference point is, for example, the centroid, the rear wheel shaft center, or the rear end part center. The first reference point and the second reference point may be located on an axis line of a vehicle body in a front-rear direction, and may be, for example, a combination in which the first reference point is a front end part of a left side surface, and the second reference point is a rear end part of the left side surface, and may be a combination in which the first reference point is a front end part of a right side surface, and the second reference point is a rear end part of the right side surface. FIG. 15 is a diagram for describing a process in the vehicle pose recognition unit 152 related to a modification example. FIG. 15 illustrates a case where a first reference point RP1 is the front end part center of another vehicle mB that is a cutting-in vehicle candidate, and a second reference point RP2 is the centroid of another vehicle mB. The vehicle pose recognition unit 152 recognizes a distance between the first reference point RP1 and the second reference point RP2 in the road width direction as a difference $\Delta Y$ in a horizontal position. When a distance in the road width direction is calculated, the vehicle pose recognition unit 152 may use a direction orthogonal to a road lane marking as the road width direction, and may use a direction orthogonal to the central line of the lane L1 or L2 as the road width direction. In this case, the preliminary action determination unit identifies the cutting-in vehicle candidate as a preliminary cutting-in vehicle, for example, in a case where a state in which a change amount $\Delta\Delta Y$ of the difference $\Delta Y$ in the horizontal position is equal to or more than a threshold value $Th_{\Delta Y}$ lasts for m or more cycles. In the above-described way, it is possible to realize fine control in consideration of a vehicle length of a cutting-in vehicle candidate. In the method of recognizing the angle $\phi$, when changes in the angle $\phi$ are the same as each other, a large vehicle and a small vehicle are identified as preliminary cutting-in vehicles at the same timing despite a difference therebetween, but, in the method of the present modification example, the large vehicle is identified as a preliminary cutting-in vehicle at an earlier timing.

Process Timings in First Cutting-in Vehicle Identification Unit and Second Cutting-in Vehicle Identification Unit In the above description, a description has been made of a case where, when one or more cutting-in vehicle candidates are extracted by the cutting-in vehicle candidate extraction unit 141 or the cutting-in vehicle candidate extraction unit 151, the control state changing unit 164 selects the first operation or the second operation and causes the following traveling control unit 162 to execute the selected operation, but this is only an example. In a case where there is no line of vehicles in the lane L2 (for example, two or more cutting-in vehicle candidates are not extracted), the control state changing unit 164 may cause the following traveling control unit 162 to execute a following traveling event based on the second operation at all times without performing the process of selecting the first operation or the second operation. In other words, the control state changing unit 164 may perform the process of selecting the first operation or the second operation only in a case where a recognition result from the recognition unit 130 shows that there is a line of vehicles in the lane L2. Consequently, the following traveling control unit 162 increases an inter-vehicle distance between the preceding vehicle mA and the own vehicle M such that another vehicle mB trying to move to the lane L1 from the lane L2 easily merges between the preceding vehicle mA and the own vehicle M, and thus gives priority to another vehicle mB over the own vehicle M. However, the number of other vehicles mB is small, and therefore it is possible to reduce the influence on traveling of the own vehicle M.

Scene in which Following Traveling Event is Executed According to First Operation In the above description, a description will be made of a case where, when a cutting-in vehicle candidate is identified as a preliminary cutting-in vehicle, the control state changing unit 164 causes the following traveling control unit 162 to execute a following traveling event according to the first operation, but this is only an example. In a case where an image generated by the in-vehicle camera 70 indicates that an occupant of the own vehicle M monitors the periphery such as gazing the front, the control state changing unit 164 may cause the following traveling control unit 162 to execute a following traveling event according to the second operation even when a cutting-in vehicle candidate is identified as a preliminary cutting-in vehicle by the first cutting-in vehicle identification unit 140 or the second cutting-in vehicle identification unit 150. Consequently, the control state changing unit 164 can prevent an occupant of the own vehicle M from feeling uneasy due to an inter-vehicle distance between the preceding vehicle mA and the own vehicle M being reduced despite the presence of another vehicle mB trying to move to the lane L1.

Process Timing except for Merging Lane

In the above description, a description has been made of a case where the first cutting-in vehicle identification unit 140 and the second cutting-in vehicle identification unit 150 perform the above-described process on another vehicle mB moving from the lane L2 that is a merging lane that merges with the lane L1, but this is only an example. The first cutting-in vehicle identification unit 140 and the second cutting-in vehicle identification unit 150 may perform the above-described process on another vehicle mB moving from an adjacent lane other than a merging lane.

Identification of Cutting-in Vehicle Based on Behavior and Position of Another Vehicle mB In the above description, a description has been made of a case where the first cutting-in vehicle identification unit 140 and the second cutting-in vehicle identification unit 150 identify a cutting-in vehicle on the basis of a behavior (for example, whether or not a cutting-in behavior is started) of another vehicle mB, the inhibition region entry determination unit 154 identifies a cutting-in vehicle on the basis of a position of the another vehicle mB (for example, whether or not the another vehicle mB is present in the inhibition region BA), and the control state changing unit 164 causes a following traveling event to be executed on the cutting-in vehicle identified on the basis of either the behavior of another vehicle mB or the position of another vehicle mB according to the second operation, but this is only an example. A cutting-in vehicle may be identified on the basis of both of a behavior and a position of another vehicle mB. In this case, the first cutting-in vehicle identification unit 140 or the second cutting-in vehicle identification unit 150 determines that a behavior of another vehicle mB is a behavior of a cutting-in vehicle, and the inhibition region entry determination unit 154 identifies, as a cutting-in vehicle, another vehicle mB of which a position is determined as being present in the inhibition region BA. The control state changing unit 164 treats, as a cutting-in vehicle, another vehicle mB that is identified as a cutting-in vehicle by both of the first cutting-in vehicle identification unit 140 or the second cutting-in vehicle identification unit 150 and the inhibition region entry determination unit 154, and causes the following traveling control unit 162 to execute a following traveling event such that an inter-vehicle distance between the preceding vehicle mA and the own vehicle M is increased (that is, according to the second operation). Consequently, the automated driving control device 100 can identify a cutting-in vehicle with higher accuracy, and can cause the own vehicle M to perform an appropriate operation in relation to the identified cutting-in vehicle.

In the above description, a description has not been made of a case where there is no road lane marking between a region of a cutting-in source and a traveling road on which the own vehicle M is traveling, but, in this case, a virtual line may be set at a position corresponding to a road lane marking, and the above-described process may be performed.

In the above description, a vehicle control device is assumed to be applied to the automated driving control device, but the vehicle control device may be applied to a driving assistance device that generally performs so-called adaptive cruise control (ACC), that is, inter-vehicle distance control or constant speed traveling control.

Hardware Configuration

Figure 16:
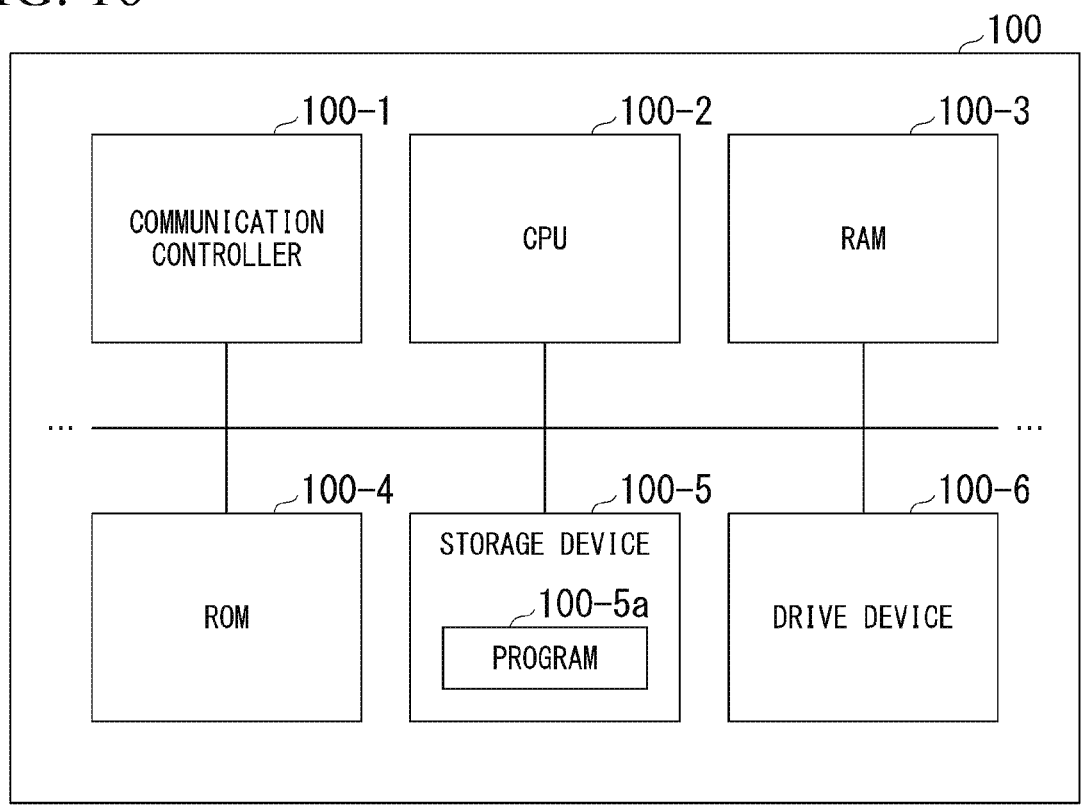
FIG. 16 is a diagram illustrating an example of a hardware configuration of the automated driving control device.

FIG. 16 is a diagram illustrating an example of a hardware configuration of the automated driving control device 100.

As illustrated, the automated driving control device 100 is configured to include a communication controller 100-1, a CPU 100-2, a random access memory (RAM) 100-3 used as a working memory, a read only memory (ROM) 100-4 storing a boot program or the like, a storage device 100-5 such as a flash memory or an hard disk drive (HDD), and a drive device 100-6 that are connected to each other via an internal bus or a dedicated communication line. The communication controller 100-1 performs communication with constituents other than the automated driving control device 100. The storage device 100-5 stores a program 100-5a executed by the CPU 100-2. The program is loaded to the RAM 100-3 by a direct memory access (DMA) controller (not illustrated), and is executed by the CPU 100-2. Consequently, some or all of the recognition unit 130, the action plan generation unit 160, and the second control unit 170 are realized.

The embodiment may be expressed as follows.

A vehicle control device includes a storage device storing a program, and a hardware processor, in which the hardware processor executes the program stored in the storage device, and thus recognizes a surrounding environment of an own vehicle, controls a speed or steering of the own vehicle on the basis of a recognition result, and causes the own vehicle to perform a first operation in which an inter-vehicle distance between a preceding vehicle and the own vehicle is reduced, and a second operation in which an inter-vehicle distance between the preceding vehicle and the own vehicle is increased after the first operation in a case where a change amount of another vehicle satisfies a predetermined condition or another vehicle is identified as a cutting-in vehicle, on the basis of one of a behavior or a position of another vehicle when another vehicle traveling in an adjacent lane that is adjacent to a traveling lane of the own vehicle changes a lane to the traveling lane.

As mentioned above, the mode for carrying out the present invention has been described by using the embodiment, but the present invention is not limited to the embodiment, and various modifications and replacements may occur within the scope without departing from the spirit of the present invention.

What is claimed is:

1. A vehicle control system comprising:
   a processor configured to:
   recognize a surrounding environment of an own vehicle;
   control a speed or steering of the own vehicle on a basis of the surrounding environment; and
   identify a cutting-in vehicle which will cut in front of the own vehicle,
   wherein the processor:
   identifies a cutting-in vehicle candidate on a basis of a behavior and a position of an other vehicle traveling in an adjacent lane that is adjacent to a traveling lane of the own vehicle;
   determines a first threshold value and a second threshold value that is more than the first threshold value on a basis of a horizontal position of the cutting-in vehicle candidate;
   identifies the cutting-in vehicle candidate as a preliminary cutting-in vehicle when a change amount of the horizontal position of the cutting-in vehicle candidate is equal to or more than the first threshold value; and
   identifies the cutting-in vehicle candidate as the cutting-in vehicle when the change amount of the horizontal position of the cutting-in vehicle candidate is equal to or more than the second threshold value,
   wherein the processor causes the own vehicle to perform a first operation shortening an inter-vehicle distance between a preceding vehicle and the own vehicle in a case where the preliminary cutting-in vehicle is identified, and
   wherein the processor causes the own-vehicle to perform a second operation lengthening the inter-vehicle distance between the preceding vehicle and the own vehicle in a case where the cutting-in vehicle is identified.

2. The vehicle control system according to claim 1, wherein the processor is further configured to
   cause the own vehicle to travel by following a preceding vehicle traveling in front of the own vehicle, and
   cause the own vehicle to follow the other vehicle in a case where the other vehicle has completed lane change to an own lane in front of the own vehicle.

3. The vehicle control system according to claim 1, wherein the adjacent lane is a merging lane in which a vehicle that is to move to the own lane is traveling.

4. The vehicle control system according to claim 1, wherein the processor is further configured to cause the own vehicle to perform the first operation and the second operation in a case where it is recognized that there is a line of vehicles in the adjacent lane.

5. The vehicle control system according to claim 1, wherein the processor is further configured to:
   cause an image of a vehicle cabin to be captured,
   wherein, in a case where it is detected based on the image that an occupant of the own vehicle is monitoring a periphery outside the own vehicle, cause the own vehicle to perform the second operation even when a behavior of the other vehicle indicates that the other vehicle will cut in front of the own vehicle.

6. A vehicle control method of causing a computer to:
   recognize a surrounding environment of an own vehicle;
   control a speed or steering of the own vehicle on a basis of the surrounding environment; and
   identify a cutting-in vehicle which will cut in front of the own vehicle,
   wherein
   a cutting-in vehicle candidate is identified on a basis of a behavior and a position of an other vehicle traveling in an adjacent lane that is adjacent to a traveling lane of the own vehicle;
   a first threshold value and a second threshold value that is more than the first threshold value is determined on a basis of a horizontal position of the cutting-in vehicle candidate;
   the cutting-in vehicle candidate is identified as a preliminary cutting-in vehicle when a change amount of the horizontal position of the cutting-in vehicle candidate is equal to or more than the first threshold value; and
   the cutting-in vehicle candidate is identified as the cutting-in vehicle when the change amount of the horizontal position of the cutting-in vehicle candidate is equal to or more than the second threshold value, and
   cause the own vehicle to perform a first operation shortening an inter-vehicle distance between a preceding vehicle and the own vehicle in a case where the preliminary cutting-in vehicle is identified, and
   cause the own vehicle to perform a second operation lengthening the inter-vehicle distance between the preceding vehicle and the own vehicle in a case where the cutting-in vehicle is identified.

7. A non-transitory computer readable storage medium storing a program causing a computer to:

recognize a surrounding environment of an own vehicle;
control a speed or steering of the own vehicle on a basis of the surrounding environment; and
identify a cutting-in vehicle which will cut in front of the own vehicle,
wherein a cutting-in vehicle candidate is identified on a basis of a behavior and a position of an other vehicle traveling in an adjacent lane that is adjacent to a traveling lane of the own vehicle;
a first threshold value and a second threshold value that is more than the first threshold value is determined on a basis of a horizontal position of the cutting-in vehicle candidate;
the cutting-in vehicle candidate is identified as a preliminary cutting-in vehicle when a change amount of the horizontal position of the cutting-in vehicle candidate is equal to or more than the first threshold value; and
the cutting-in vehicle candidate is identified as the cutting-in vehicle when the change amount of the horizontal position of the cutting-in vehicle candidate is equal to or more than the second threshold value, and
cause the own vehicle to perform a first operation shortening an inter-vehicle distance between a preceding vehicle and the own vehicle in a case where the preliminary cutting-in vehicle is identified, and a second operation lengthening the inter-vehicle distance between the preceding vehicle and the own vehicle in a case where the cutting-in vehicle is identified.

\* \* \* \* \*